(12) United States Patent
Aoki et al.

(10) Patent No.: US 11,871,490 B2
(45) Date of Patent: Jan. 9, 2024

(54) LIGHTING CONTROL DEVICE, LIGHTING DEVICE, AND VEHICLE

(71) Applicant: ROHM CO., LTD., Kyoto (JP)

(72) Inventors: Akira Aoki, Kyoto (JP); Ryo Takagi, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 0 days.

(21) Appl. No.: 17/913,339

(22) PCT Filed: Sep. 29, 2020

(86) PCT No.: PCT/JP2020/037022
§ 371 (c)(1),
(2) Date: Sep. 21, 2022

(87) PCT Pub. No.: WO2021/192368
PCT Pub. Date: Sep. 30, 2021

(65) Prior Publication Data
US 2023/0164892 A1    May 25, 2023

(30) Foreign Application Priority Data

Mar. 24, 2020    (JP) ................... 2020-052638

(51) Int. Cl.
*H05B 45/14*    (2020.01)
*H05B 45/325*    (2020.01)
*B60Q 1/14*    (2006.01)

(52) U.S. Cl.
CPC .......... *H05B 45/14* (2020.01); *B60Q 1/1415* (2013.01); *H05B 45/325* (2020.01); *B60Q 2300/05* (2013.01)

(58) Field of Classification Search
CPC .. H05B 45/14; H05B 45/325; H05B 45/3725; H05B 47/10; B60Q 1/1415; B60Q 2300/05
See application file for complete search history.

(56) References Cited

U.S. PATENT DOCUMENTS

| 2010/0308738 A1* | 12/2010 | Shteynberg ............ H05B 45/44 315/185 R |
| 2012/0019714 A1* | 1/2012 | Hiramatu ............... H05B 47/16 348/370 |

(Continued)

FOREIGN PATENT DOCUMENTS

| CN | 1736018 A | * | 2/2006 | ............ G05F 3/262 |
| CN | 110495252 A | * | 11/2019 | ............ H02M 1/36 |

(Continued)

OTHER PUBLICATIONS

International Search Report in International Appln. No. PCT/JP2020/037022, dated Nov. 17, 2020, 5 pages (with English Translation).

*Primary Examiner* — Abdullah A Riyami
*Assistant Examiner* — Syed M Kaiser
(74) *Attorney, Agent, or Firm* — Fish & Richardson P.C.

(57) ABSTRACT

A lighting control device switches an input voltage to generate an output voltage and supplies a driving current based on the output voltage to a lighting unit. A raw control signal is generated to specify a lighting period and an extinction period alternately, and a corrected control signal is generated by correcting the raw control signal based on the current through the lighting unit. A switching controller performs the switching of the input voltage during the lighting period specified by the corrected control signal and suspends the switching of the input voltage during the extinction period specified by the corrected control signal.

9 Claims, 12 Drawing Sheets

(56) References Cited

U.S. PATENT DOCUMENTS

| | | | | |
|---|---|---|---|---|
| 2012/0249000 A1* | 10/2012 | Kawai | ................ | H05B 45/3725 |
| | | | | 315/200 R |
| 2012/0249013 A1* | 10/2012 | Valois | .................... | H05B 45/18 |
| | | | | 315/291 |
| 2013/0141016 A1* | 6/2013 | Esaki | .................... | H05B 45/10 |
| | | | | 315/307 |
| 2015/0189706 A1* | 7/2015 | Yang | ...................... | H05B 45/46 |
| | | | | 315/224 |
| 2017/0188420 A1* | 6/2017 | Kido | ...................... | H05B 47/24 |
| 2017/0236472 A1* | 8/2017 | Yonemaru | .............. | G09G 3/342 |
| | | | | 345/690 |
| 2022/0159800 A1* | 5/2022 | Nakayama | ......... | H05B 45/3725 |

FOREIGN PATENT DOCUMENTS

| | | | | |
|---|---|---|---|---|
| JP | 2019103289 | | 6/2019 | |
| KR | 101528636 B1 * | | 6/2015 | ......... H05B 37/0227 |
| WO | WO-2012014857 A1 * | | 2/2012 | ........ H02M 3/33523 |

* cited by examiner

LIGHTING CONTROL DEVICE, LIGHTING DEVICE, AND VEHICLE

TECHNICAL FIELD

The present disclosure relates to lighting control devices, lighting devices, and vehicles.

BACKGROUND ART

FIG. 12 shows a lighting device 910 of a first reference configuration. In the lighting device 910, a lighting control device 911 performs switching driving of an output transistor 913 constituting a boost (step-up) converter and thereby generates from an input voltage Vin an output voltage Vout, and a driving current Iled based on the output voltage Vout is supplied to a lighting unit 912 composed of one or more light-emitting diodes, thereby to make the lighting unit 912 emit light. Between a terminal to which the output voltage Vout is applied and the positive terminal 912P of the lighting unit 912, a load switch LDsw configured with a field-effect transistor is inserted so that, only when the load switch LDsw is on, the driving current Iled is supplied to the lighting unit 912. The negative terminal 912N of the lighting unit 912 is connected via a diode 914 to a terminal to which the input voltage Vin is applied.

In the lighting device 910, the lighting unit 912 is PWM-driven base on a control signal CNT generated by the lighting control device 911, and thereby the dimming of the lighting unit 912 is achieved. FIG. 13 is a diagram illustrating the operation of the lighting device 910. In the lighting device 910, only during the high-level period of the control signal CNT, the switching driving of the output transistor 913 is performed and in addition the load switch LDsw is kept on. Through the adjustment of the duty of the control signal CNT, the dimming of the lighting unit 912 is achieved. The lighting device 910 in FIG. 12 provides high dimming accuracy (fast response of the driving current Iled) while requiring the load switch LDsw. Moreover, in the event of a ground short in which the terminal 912P or 912N short-circuits to the ground, the path for the driving current Iled has to be shut off, and the load switch LDsw is required also for such shutting-off.

FIG. 14 shows a lighting device 930 of a second reference configuration. In the lighting device 930, a lighting control device 931 performs switching driving of an output transistor 933 constituting a buck (step-down) converter and thereby generates from an input voltage Vin an output voltage Vout, and a driving current Iled based on the output voltage Vout is supplied to a lighting unit 932 composed of one or more light-emitting diodes, thereby to make the lighting unit 932 emit light. The lighting unit 932 is connected to a load switch LDsw in series so that, only when the load switch LDsw is on, the driving current Iled is supplied to the lighting unit 932. In the lighting device 930, the ground gnd1 for the input voltage Vin is different from the ground gnd2 for the output voltage Vout, and the potential of the output voltage Vout is equal to the potential of the ground gnd1.

In the lighting device 930, the lighting unit 932 is PWM-driven base on a control signal CNT generated by the lighting control device 931, and thereby the dimming of the lighting unit 932 is achieved. FIG. 15 is a diagram illustrating the operation of the lighting device 930. In the lighting device 930, only during the high-level period of the control signal CNT, the switching driving of the output transistor 933 is performed and in addition the load switch LDsw is kept on. Through the adjustment of the duty of the control signal CNT, the dimming of the lighting unit 932 is achieved. The lighting device 930 in FIG. 14 provides high dimming accuracy (fast response of the driving current Iled) while requiring the load switch LDsw. Here, however, in the configuration of the lighting device 930 in FIG. 14, as distinct from the configuration of the lighting device 910 in FIG. 12, coping with a ground short does not require the load switch LDsw. In the lighting device 930 in FIG. 14, even if the positive or negative terminal 932P or 932N in the lighting unit 932 short-circuits to the ground gnd1, simply the driving current Iled ceases to flow, and thus no extra protection is required.

CITATION LIST

Patent Literature

Patent Document 1: JP-A-2019-103289

Summary of Disclosure

Technical Problem

Eliminating the load switch LDsw would provide benefits such as reduced costs. Accordingly, a study will now be made on a lighting device 930a shown in FIG. 16 resulting from omitting the load switch LDsw from the lighting device 930 in FIG. 14. In the lighting device 930a in FIG. 16, the operation of a buck converter configured to include an output transistor 933 is turned on and off and thereby dimming is achieved by PWM. Specifically, during the high-level period of the control signal CNT, the buck converter is kept on (the buck converter is kept in operation) to keep the lighting unit 932 lit; during the low-level period of the control signal CNT, the buck converter is kept off (the buck converter is kept out of operation) to keep the lighting unit 932 extinguished.

Inconveniently, with the scheme of the lighting device 930a, the response of the driving current Iled suffers a delay from the control signal CNT. FIG. 17 is a diagram illustrating the operation of the lighting device 930a. In the lighting device 930a, in response to the control signal CNT turning from low level to high level, the switching driving of the output transistor 933 is started (that is, the operation of the buck converter is turned on) but, immediately after the start of the switching by the output transistor 933, the output voltage Vout has not risen to be high enough to let the driving current Iled flow; only when a delay time td has passed after the turning of the control signal CNT to high level does the driving current Iled reach the desired current value to permit the lighting unit 932 to emit light with the desired luminance.

As described above, in the lighting device 930a, due to the delay time td, in each cycle of PWM driving, the light emission time of the lighting unit 932 is shorter than that specified by the control signal CNT, making it difficult to perform desired dimming.

An object of the present disclosure is to provide a lighting control device that permits desired dimming while achieving a reduced number of components, and to provide a lighting device and a vehicle that employ such a lighting control device.

Solution to Problem

According to one aspect of the present disclosure, a lighting control device that generates an output voltage by switching of an input voltage and that supplies a driving current based on the output voltage to a lighting unit to light the lighting unit includes: a control signal generator configured to generate as a raw control signal a control signal that specifies alternately a lighting period in which to keep the lighting unit lit and a extinction period in which to keep the lighting unit extinguished; a lighting unit current sensor configured to sense the current flowing through the lighting unit; a control signal corrector configured to generate a corrected control signal by correcting, based on a current state signal based on the result of sensing by the lighting unit current sensor, the raw control signal in a direction in which the lighting period is extended; and a switching controller configured to perform the switching of the input voltage during the lighting period specified by the corrected control signal and suspend the switching of the input voltage during the extinction period specified by the corrected control signal. (A first configuration.)

In the lighting control device of the first configuration described above, in each of the raw control signal and the corrected control signal, the lighting period and the extinction period may be specified alternately at a predetermined cycle, and in each cycle, the lighting period in the corrected control signal may be extended compared with the lighting period in the raw control signal by correction by the control signal corrector. (A second configuration.)

In the lighting control device of the first or second configuration described above, the control signal corrector may be configured to generate the corrected control signal by, while keeping the start timing of the lighting period the same before and after correction, correcting the raw control signal in the direction in which the lighting period is extended by the time required, after the start of the lighting period, for the current flowing through the lighting unit to reach a predetermined judgement current. (A third configuration.)

In the lighting control device of the third configuration described above, there may be further provided a current state signal generator configured to generate the current state signal. The current state signal generator may be configured such that, after the start of the switching of the input voltage, when the output voltage has risen until the current flowing through the lighting unit reaches the judgement current, the current state signal generator switches the current state signal from a first state to a second state. The control signal corrector may be configured to correct the raw control signal in the direction in which the lighting period is extended by the time after the start of the lighting period until the current state signal turns from the first state to the second state. (A fourth configuration.)

In the lighting control device of the fourth configuration described above, the control signal corrector may be configured to perform a first measurement process to measure a first time after the start of the lighting period until the current state signal turns from the first state to the second state, perform a second measurement process to measure the time lapse after the timing of a transition from the lighting period to the extinction period in the raw control signal, and switch the period specified by the current state signal from the lighting period to the extinction period when, after the first measurement process, the time lapse in the second measurement process reaches the first time. (A fifth configuration.)

In the lighting control device of the fifth configuration described above, the control signal corrector may include an up/down counter and may be configured to perform the first and second measurement processes using the up/down counter. (A sixth configuration.)

In the lighting control device of the sixth configuration described above, the up/down counter may be configured such that, after the start of the lighting period until the current state signal turns from the first state to the second state, synchronously with a predetermined clock signal, the up/down counter changes the count value, starting at a predetermined initial value, in a first direction and then, after the timing of the transition from the lighting period to the extinction period in the raw control signal until the count value returns to the initial value, the up/down counter changes, synchronously with the clock signal, the count value in a second direction opposite to the first direction. The first measurement process may be achieved by the count value being changed in the first direction and the second measurement process may be achieved by the count value being changed in the second direction. The control signal corrector may be configured to switch the period specified by the corrected control signal from the lighting period to the extinction period when the count value has returned to the initial value in the second measurement process. (A seventh configuration.)

In the lighting control device of any of the first to seventh configurations described above, the lighting unit may include one or more light-emitting elements that emit light by being supplied with a current. (An eighth configuration.)

According to another aspect of the present disclosure, a lighting device includes: the lighting control device according to any of the first to eighth configurations described above; and a lighting unit configured to be supplied with a driving current under the control of the lighting control device. (A ninth configuration.)

According to yet another aspect of the present disclosure, a vehicle includes: the lighting device according to the ninth configuration described above as a vehicle-mounted lighting apparatus; a voltage source configured to supply the lighting device with an input voltage; and a body in which the lighting apparatus is installed. (A tenth configuration.)

Advantageous Effects of Disclosure

According to the present disclosure, it is possible to provide a lighting control device that permits desired dimming while achieving a reduced number of components, and to provide a lighting device and a vehicle that employ such a lighting control device

DESCRIPTION OF EMBODIMENTS

Figure 1:
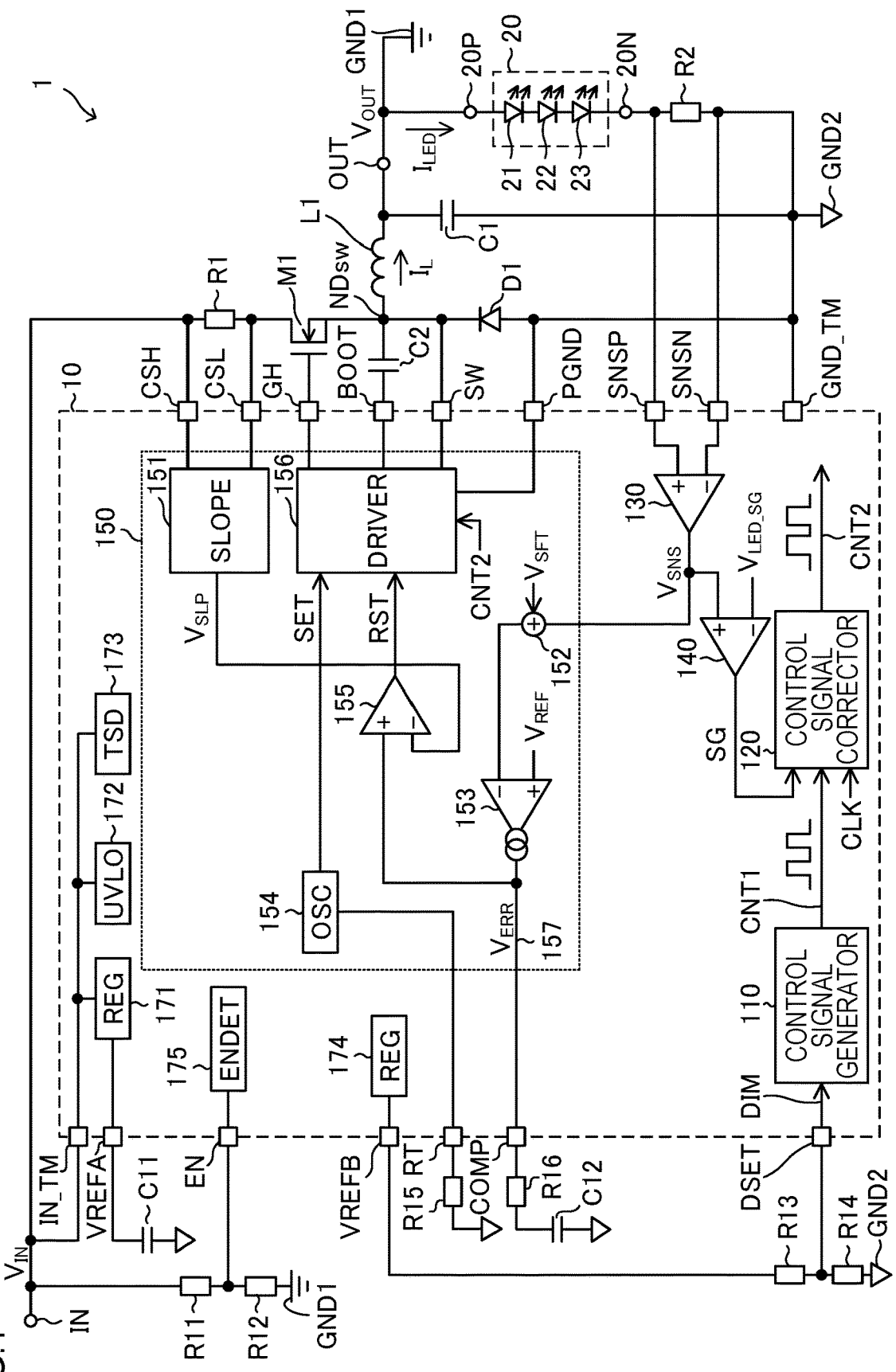
FIG. 1 is an overall configuration diagram of a lighting device according to a first embodiment of the present disclosure.

Hereinafter, examples of implementing the present disclosure will be described specifically with reference to the accompanying drawings. Among the diagrams referred to in the course, the same parts are identified by the same reference signs, and in principle no overlapping description of the same parts will be repeated. In the present description, for the sake of simplicity, symbols and reference signs referring to information, signals, physical quantities, elements, parts, and the like are occasionally used with omission or abbreviation of the names of the information, signals, physical quantities, elements, parts, and the like corresponding to those symbols and reference signs. For example, the control signal described later and identified by the reference sign "CNT1" (see FIG. 1) is sometimes referred to as the control signal CNT1 and other times abbreviated to the signal CNT1, both referring to the same entity.

First, some of the terms used to describe embodiments of the present disclosure will be defined. "Level" denotes the level of a potential, and for any signal or voltage, "high level" has a higher potential than "low level". For any signal or voltage, its being at high level means its level being equal to high level, and its being at low level means its level being equal to low level. A level of a signal is occasionally referred to as a signal level, and a level of a voltage is occasionally referred to as a voltage level.

For any signal or voltage, a transition from low level to high level is termed an up edge, and the timing of a transition from low level to high level is termed an up-edge timing. Likewise, for any signal or voltage, a transition from high level to low level is termed a down edge, and the timing of a transition from high level to low level is termed a down-edge timing.

For any transistor configured as an FET (field-effect transistor), which can be a MOSFET, "on state" refers to a state where the drain-source channel of the transistor is conducting, and "off state" refers to a state where the drain-source channel of the transistor is not conducting (cut off). Similar definitions apply to any transistor that is not classified as an FET. Unless otherwise stated, any MOSFET can be understood to be an enhancement MOSFET. "MOSFET" is an abbreviation of "metal-oxide-semiconductor field-effect transistor".

Any switch can be configured with one or more FETs (field-effect transistors). When a given switch is in the on state, the switch conducts across its terminals; when a given switch is in the off state, the switch does not conduct across its terminals.

For any transistor or switch, its being in the on or off state is occasionally expressed simply as its being on or off respectively. For any transistor or switch, its switching from the off state to the on state is expressed as a turning-on, and its switching from the on state to the off state is expressed as a turning-off. For any transistor or switch, a period in which it is in the on state is occasionally referred to as an on period, and a period in which it is in the off state is occasionally referred to as an off period. For any signal that takes as its signal level high level or low level, a period in which the signal is at high level is referred to as a high-level period and a period in which the signal is at low level is referred to as a low-level period. The same applies to any voltage that takes as its voltage level high level or low level.

First Embodiment

A first embodiment of the present disclosure will be described. FIG. 1 is an overall configuration diagram of a lighting device 1 according to the first embodiment. The lighting device 1 includes a lighting control device 10 and a lighting unit 20, and also includes discrete components connected to the lighting control device 10 or the lighting unit 20. The discrete components provided in the lighting device 1 include an output transistor M1, an inductor L1, a diode D1, capacitors C1 and C2, and resistors R1 and R2, and further include resistors R11 to R16 and capacitors C11 and C12. The output transistor M1 is configured as an N-channel MOSFET. A modification is however possible by using a P-channel MOSFET as the output transistor M1.

Figure 2:
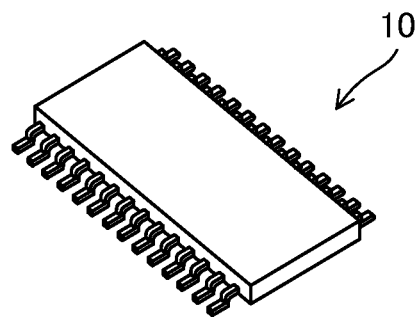
FIG. 2 is an external perspective view of a lighting control device according to the first embodiment of the present disclosure.

The lighting control device 10 is a control device that operates by being supplied with a positive direct-current input voltage $V_{IN}$ and that switches the state of light-emitting elements constituting the lighting unit 20 between a lit state and an extinguished state. The lighting control device 10 is an electronic component (semiconductor device) as shown in FIG. 2 that is formed by sealing a semiconductor integrated circuit into a housing (package) formed of resin, and has the circuits constituting the lighting control device 10 integrated on a semiconductor substrate. The housing of the lighting control device 10 has a plurality of external terminals formed so as to be exposed out of it, and those external terminals include terminals CSH, CSL, GH, BOOT, SW, PGND, SNSP, SNSN, GND_TM, IN_TM, VREFA, EN, VREFB, RT, COMP, and DSET shown in FIG. 1, and can further include other terminals that are not shown in FIG. 1. The number of external terminals on, and the exterior appearance of, the lighting control device 10 shown in FIG. 2 are simply illustrative.

The lighting unit 20 is composed of one or more light-emitting elements that emit light by being supplied with a current. The lighting unit 20 is composed of a plurality of light-emitting diodes connected in series. The lighting unit 20 is provided between terminals 20P and 20N. In FIG. 1, a series circuit of light-emitting diodes 21 to 23 constitutes the lighting unit 20, with the anode of the light-emitting diode 21 connected to the terminal 20P, the cathode of the light-emitting diode 21 connected to the anode of the light-emitting diode 22, the cathode of the light-emitting diode 22 connected to the anode of the light-emitting diode 23, and the cathode of the light-emitting diode 23 connected to the terminal 20N. The number of light-emitting diodes constituting the lighting unit 20 may be one or two or four or more. The lighting unit 20 may include a parallel circuit of a plurality of light-emitting diodes.

The lighting device 1 includes a ground GND1 as one electrically conductive part at a reference potential (i.e., a reference potential part), and also includes a ground GND2 as another electrically conductive part at a reference potential (i.e., a reference potential part). While there can be timings at which the potentials of the grounds GND1 and GND2 are equal, so long as the positive input voltage $V_{IN}$ is fed to the lighting device 1 and the switching driving of the output transistor M1 is performed, the grounds GND1 and GND2 have different potentials.

In the lighting device 1, the input voltage $V_{IN}$ applied to an input terminal IN can be bucked (stepped down) to generate an output voltage $V_{OUT}$ at an output terminal OUT. The input voltage $V_{IN}$ is a positive direct-current voltage with reference to the ground GND1. That is, the input voltage $V_{IN}$ is applied to the input terminal IN with reference to the potential of the ground GND1. In other words, the input voltage $V_{IN}$ is applied between the ground GND1 and the input terminal IN with the potential of the ground GND1 on the negative side. On the other hand, the output voltage $V_{OUT}$ is a positive direct-current voltage with reference to the ground GND2. That is, the output voltage $V_{OUT}$ is applied to the output terminal OUT with reference to the potential of the ground GND2. In other words, the output voltage $V_{OUT}$ is applied between the ground GND2 and the output terminal OUT with the potential of the ground GND2 on the negative side. In the lighting device 1, the output terminal OUT is connected to the ground GND1.

A description will now be given of the interconnection between the discrete components and the lighting control device 10 or the lighting unit 20, all provided in the lighting device 1.

One terminal of the resistor R1 is connected to the input terminal IN and also to the terminal CSH. The other terminal of the resistor R1 is connected to the drain of the output transistor M1 and also to the terminal CSL. The gate of the output transistor M1 is connected to the terminal GH.

The source of the output transistor M1 is connected to a node NDsw and also to the terminal SW. To the node NDsw, one terminal of the inductor L1 and the cathode of the diode D1 are both connected, and the node NDsw is connected also via the capacitor C2 to the terminal BOOT. The other terminal of the inductor L1 is connected to the output terminal OUT, and is also connected via the capacitor C1 to the ground GND2. The anode of the diode D1 is connected to the ground GND2. The terminals PGND and GND_TM are connected to the ground GND2. The terminal 20P is connected to the output terminal OUT, and the terminal 20N is connected via the resistor R2 to the ground GND2. The connection node between the resistor R2 and the terminal 20N is connected to the terminal SNSP, and the connection node between the resistor R2 and the ground GND2 is connected to the terminal SNSN. The circuits within the lighting control device 10 operate with reference to the potential at the terminal GND_TM (i.e., the potential of the ground GND2).

The output transistor M1, the diode D1, the inductor L1, and the capacitor C1 constitute a DC-DC converter (buck converter) that bucks the input voltage $V_{IN}$ to generate the output voltage $V_{OUT}$. Such blocks that control the switching of the output transistor M1 (i.e., a switching controller 150 and an amplifier 130, which will be described later) are included among the elements constituting the DC-DC converter.

The terminal IN_TM is connected to the input terminal IN. The terminal VREFA is connected via the capacitor C11 to the ground GND2. The input terminal IN is connected to one terminal of the resistor R11, and the other terminal of the resistor R11 is connected via the resistor R12 to the ground GND1. The connection node between the resistors R11 and R12 is connected to the terminal EN. The terminal VREFB is connected to one terminal of the resistor R13, and the other terminal of the resistor R13 is connected via the resistor R14 to the ground GND2. The connection node between the resistors R13 and R14 is connected to the terminal DSET. The terminal RT is connected via the resistor R15 to the ground GND2. The terminal COMP is connected to one terminal of the resistor R16, and the other terminal of the resistor R16 is connected via the capacitor C12 to the ground GND2.

In the following description, the current flowing through the inductor L1 will occasionally be referred to as the inductor current and identified by the symbol "$I_L$". The inductor current $I_L$ flows from the node NDsw to the output terminal OUT. The current flowing through the lighting unit 20 will occasionally be referred to as the driving current and identified by the symbol "$I_{LED}$". The driving current LED flows from the output terminal OUT to the ground GND2.

In the present description, the state of the lighting unit 20 or the light-emitting elements where they are not emitting light will be referred to as their being unlit or extinguished. As the contrary term, the state of the lighting unit 20 or the light-emitting elements where they are emitting light will sometimes be referred to as their being lit; for the lighting unit 20 or the light-emitting elements, their emitting light is synonymous with their being lit. Strictly speaking, even when a very low current is flowing through the lighting unit 20 or the light-emitting elements, they can emit light at a very low luminance; in the following description, however, it is assumed that, when a driving current $I_{LED}$ of a predetermined threshold value or more is flowing in the lighting unit 20 or the light-emitting elements, they are lit (in a lit state) and that, when a driving current $I_{LED}$ of a predetermined threshold value or more is not flowing in the lighting unit 20 or the light-emitting elements, they are extinguished (in an extinguished state).

Next, the internal configuration of the lighting control device 10 will be described. The lighting control device 10 includes a control signal generator 110, a control signal corrector 120, an amplifier 130, a comparator 140, a switching controller 150, and blocks identified by the reference signs 171 to 175.

The control signal generator 110 generates a control signal CNT1 based on a dimming signal DIM fed in via the terminal DSET. In the lighting device 1, the lighting unit 20 is PWM-driven. PWM is short for pulse width modulation. The control signal CNT1 corresponds to a pulse width modulation signal in PWM driving. The control signal CNT1, and also the control signal CNT2 described later, is a binary signal that takes as its signal level either high or low level.

Figure 3:
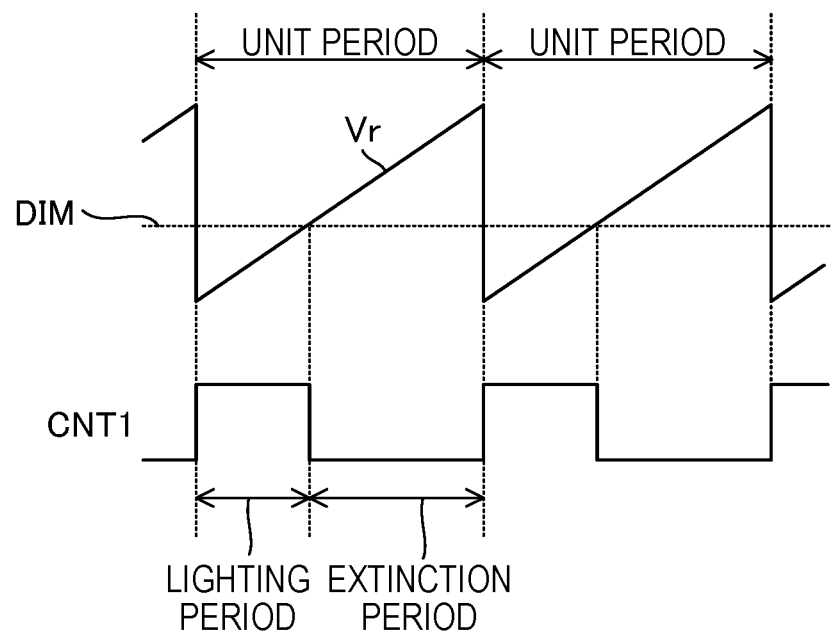
FIG. 3 is a diagram showing a relationship among a dimming signal, a ramp voltage, and a control signal according to the first embodiment of the present disclosure.

Referring to FIG. 3, an additional description follows. FIG. 3 shows the relationship among the dimming signal DIM, a ramp voltage Vr, and the control signal CNT1. In the configuration example of the lighting device 1 in FIG. 1, the dimming signal DIM is an analog voltage fed to the terminal DSET, and has a predetermined direct-current voltage value with the lighting control device 10 in a stable state. The control signal generator 110 generates a ramp voltage Vr of which the voltage value changes so as to describe sawtooth or triangular waves at a predetermined PWM frequency, namely a frequency $f_{PWM}$. The reciprocal of the frequency $f_{PWM}$ is the cycle of the ramp voltage Vr, and a period with a length corresponding to one cycle of the ramp voltage Vr will be referred to as a unit period. A plurality of unit periods occur one after another at the frequency $f_{PWM}$ as time passes. The end timing of one unit period coincides with the start timing of the next unit period. In each unit period, the ramp voltage Vr equals a predetermined lower-limit voltage at the start of the unit period and increases monotonically from the lower-limit voltage to a predetermined higher-limit voltage over the length of one unit period. The lower-limit voltage is, for example, equal to the potential of ground GND2. The higher-limit voltage is higher than the lower-limit voltage. The control signal generator 110 keeps the control signal CNT1 at high level during a period in which the level of the dimming signal DIM is higher than the level of the ramp voltage Vr, and keeps the control signal CNT1 at low level during a period in which the level of the dimming signal DIM is lower than the level of the ramp voltage Vr.

The control signal CNT1 specifies, within each unit period, a lighting period and an extinction period. The lighting period is a period in which the lighting unit 20 is supposed to be lit; the extinction period is a period in which the lighting unit 20 is supposed to be extinguished. Each unit period comprises a combination of one lighting period and one extinction period, and the control signal CNT1 specifies the lighting period and the extinction period alternately at a cycle corresponding to the reciprocal of the frequency $f_{PWM}$. While it is here assumed that the start timing of the unit period coincides with the start timing of the lighting period, a modification is possible where they do not coincide.

Figure 4:
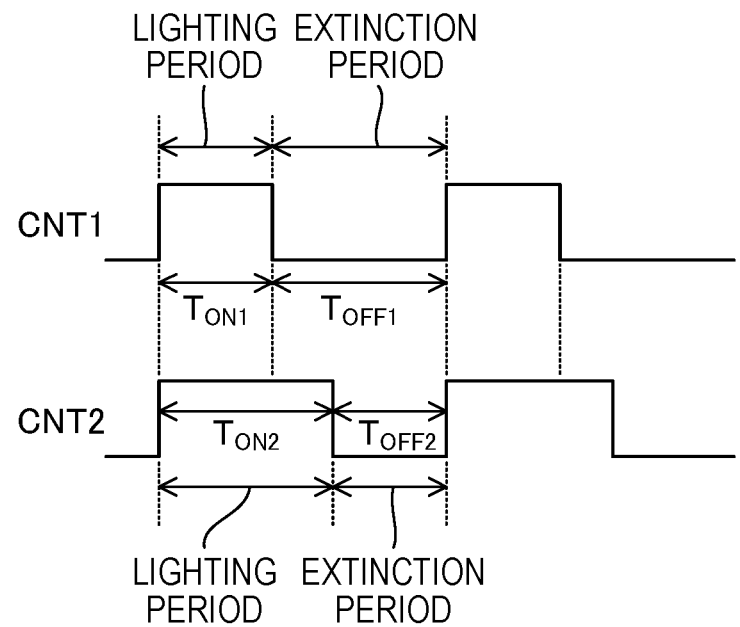
FIG. 4 is a diagram showing a relationship between control signals before and after correction according to the first embodiment of the present disclosure.

The control signal corrector 120 corrects the control signal CNT1 based on a current state signal SG, which will be described later, and outputs the control signal CNT1 having undergone correction as a control signal CNT2. The control signals CNT1 and CNT2 can be called a raw control signal and a corrected control signal respectively. FIG. 4 shows an outline of the correction by the control signal corrector 120. Like the control signal CNT1, the control signal CNT2 is a control signal that specifies the lighting period and the extinction period alternately at a cycle corresponding to the reciprocal of the frequency $f_{PWM}$. In the control signal CNT2, a period in which it is at high level corresponds to the lighting period and a period in which it is at low level corresponds to the extinction period.

In each unit period, the start timing of the lighting period specified by the control signal CNT1 coincides with the start timing of the lighting period specified by the control signal CNT2. However, in each unit period, the lighting period in the control signal CNT2 is longer than the lighting period in the control signal CNT1. That is, the control signal CNT1 is corrected in a direction in which the lighting period is extended, and thereby the control signal CNT2 is generated.

In FIG. 4, time $T_{ON1}$ represents the length of the high-level period of the control signal CNT1 in one unit period (i.e., the length of the lighting period specified by the control signal CNT1), and time $T_{OFF1}$ represents the length of the low-level period of the control signal CNT1 in one unit period (i.e., the length of the extinction period specified by the control signal CNT1). Time $T_{ON2}$ represents the length of the high-level period of the control signal CNT2 in one unit period (i.e., the length of the lighting period specified by the control signal CNT2), and time $T_{OFF2}$ represents the length of the low-level period of the control signal CNT2 in one unit period (i.e., the length of the extinction period specified by the control signal CNT2).

Suppose that, in each unit period, the lighting unit 20 is lit for time $T_{ON1}$ and is extinguished for time $T_{OFF1}$. Then the ratio $T_{ON1}/(T_{ON1}+T_{OFF1})$ represents the duty of lighting in the lighting unit 20. Suppose that, in each unit period, the lighting unit 20 is lit for time $T_{ON2}$ and is extinguished for time $T_{OFF2}$. Then the ratio $T_{ON2}/(T_{ON2}+T_{OFF2})$ represents the duty of lighting in the lighting unit 20.

The amplifier 130 is an example of a lighting unit current sensor that senses the driving current $I_{LED}$ that flows through the lighting unit 20. The resistor R2 may be understood to be included among the elements constituting the lighting unit current sensor. Specifically, a voltage proportional to the driving current $I_{LED}$ appears across the resistor R2 as a voltage drop across it (i.e., the terminal-to-terminal voltage across the resistor R2), and the voltage drop across the resistor R2 is fed via the terminals SNSP and SNSN to the amplifier 130. The amplifier 130 amplifies the signal reflecting the voltage drop across the resistor R2, and outputs the result of the amplification as a voltage signal $V_{SNS}$. The voltage signal $V_{SNS}$ has a voltage value proportional to the driving current $I_{LED}$. In the following description, the voltage signal $V_{SNS}$ will occasionally be referred to also as the sense voltage $V_{SNS}$. The sense voltage $V_{SNS}$ has a potential with reference to the ground GND2, and increases as the driving current $I_{LED}$ increases.

The comparator 140 is an example of a current state signal generator. The comparator 140 is fed with the sense voltage $V_{SNS}$ from the amplifier 130 and, based on the sense voltage $V_{SNS}$, generates and outputs a current state signal SG commensurate with the driving current $I_{LED}$. Specifically, the non-inverting input terminal of the comparator 140 is fed with the sense voltage $V_{SNS}$ from the amplifier 130, and the inverting input terminal of the comparator 140 is fed with a predetermined judgment voltage $V_{LED\_SG}$. The judgment voltage $V_{LED\_SG}$ has a predetermined potential higher than the ground GND2.

Figure 5:
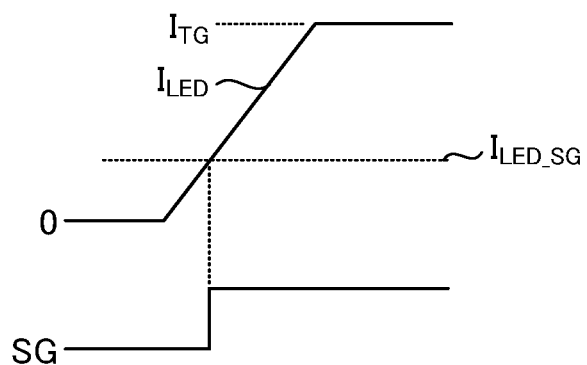
FIG. 5 is a diagram showing a relationship between a current through a lighting unit and a current state signal according to the first embodiment of the present disclosure.

For the driving current $I_{LED}$ that flows through the lighting unit 20 in the lighting period, a target current $I_{TG}$ is set (see FIG. 5). The target current $I_{TG}$ may be set at any current value, and is set, for example, at 1 A (ampere). The judgment voltage $V_{LED\_SG}$ is set beforehand such that when the driving current $I_{LED}$ is equal to a predetermined judgment current $I_{LED\_SG}$ lower than the target current $I_{TG}$, the sense voltage $V_{SNS}$ is equal to the judgment voltage $V_{LED\_SG}$.

FIG. 5 shows the relationship of the current state signal SG with other relevant currents. As shown in FIG. 5, the judgment current $I_{LED\_SG}$ is lower than the target current $I_{TG}$, and is set at, for example, 10% or 20% of the target current $I_{TG}$. The current state signal SG is at low level when the sense voltage $V_{SNS}$ is lower than the judgment voltage $V_{LED\_SG}$ (i.e., when $I_{LED}<I_{LED\_SG}$), and is at high level when the sense voltage $V_{SNS}$ is higher than the judgment voltage $V_{LED\_SG}$ (i.e., when $I_{LED}>I_{LED\_SG}$). When the sense voltage $V_{SNS}$ is equal to the judgment voltage $V_{LED\_SG}$, the current state signal SG is at either high or low level.

The switching controller 150 performs the switching driving of the output transistor M1 during the lighting period specified by the control signal CNT2. Through the switching driving of the output transistor M1, the input voltage $V_{IN}$ is switched to generate the output voltage $V_{OUT}$ sufficiently high to light the lighting unit 20. The switching controller 150 suspends the switching driving of the output transistor M1 during the extinction period specified by the control signal CNT2. Suspending the switching driving of the output transistor M1 is equivalent to keeping the output transistor M1 in the off state, and thus to suspending the switching of the input voltage Vin. When the switching driving of the output transistor M1 is suspended, the supply of electric power from the input terminal IN to the output terminal OUT is suspended, and thus the lighting unit 20 is extinguished, though, for a while after a switch from the lighting period to the extinction period, the lighting unit 20 may keep lighting based on the electric charge stored in the capacitor C1.

In the configuration example shown in FIG. 1, the switching controller 150 includes a slope voltage generator 151, an adder 152, an error amplifier 153, an oscillator 154, a comparator 155, and a driver 156.

The slope voltage generator 151 is fed with the voltage drop across the resistor R1 (i.e., the terminal-to-terminal voltage across the resistor R1) via the terminals CSH and CSL, thereby to sense the current flowing through the output transistor M1 (in other words, the inductor current $I_L$), and generates a slope voltage $V_{SLP}$ commensurate with the current that flows through the output transistor M1 (in other words, the inductor current $I_L$) during its on period. The slope voltage $V_{SLP}$ increases as the voltage drop across the resistor R1 increases.

The adder 152 adds a predetermined positive voltage $V_{SFT}$ (e.g., 200 mV) to the voltage $V_{SNS}$ from the amplifier 130, and outputs the resulting sum voltage ($V_{SNS}+V_{SFT}$).

The error amplifier 153 is a conductance amplifier. The inverting terminal of the error amplifier 153 is fed with the voltage ($V_{SNS}+V_{SFT}$), and the non-inverting input terminal of the error amplifier 153 is fed with a predetermined positive reference voltage $V_{REF}$. The output terminal of the error amplifier 153 is connected to a conductor 157. The error amplifier 153 lets pass, in and out between its output terminal and the conductor 157, a current commensurate with the error between the voltage ($V_{SNS}+V_{SFT}$) and the reference voltage $V_{REF}$. The output terminal of the error amplifier 153 is connected via the conductor 157 to the terminal COMP, and an error voltage $V_{ERR}$ commensurate with the error between the voltage ($V_{SNS}+V_{SFT}$) and the reference voltage $V_{REF}$ appears on the conductor 157. The resistor R16 and the capacitor C12 compensate the phase of the error voltage $V_{ERR}$. The error amplifier 153, when $V_{SNS}$ $V_{SFT}<V_{REF}$, outputs a current to the conductor 157 so as to raise the error voltage $V_{ERR}$ and, when $V_{SNS}$ $V_{SFT}>V_{REF}$, draws in a current from the conductor 157 so as to lower the error voltage $V_{ERR}$.

The oscillator 154 generates and outputs a signal SET of which the signal level changes between low and high levels cyclically. The frequency $f_{SW}$ of the signal SET corresponds to the switching frequency of the output transistor M1. The frequency $f_{SW}$ is significantly higher than the frequency $f_{PWM}$ of the control signals CNT1 and CNT2. For example, whereas the frequency $f_{PWM}$ is about several hundred hertz, the frequency $f_{SW}$ is several tens of kilohertz to several hundred kilohertz. The frequency $f_{SW}$ is set variably according to the resistance value of the resistor R15 connected to the terminal RT, though the frequency $f_{SW}$ may be a fixed frequency.

The non-inverting input terminal and the inverting input terminal of the comparator 155 are fed with the error voltage $V_{ERR}$ and the slope voltage $V_{SLP}$ respectively. The comparator 155 compares the error voltage $V_{ERR}$ and the slope voltage $V_{SLP}$ and outputs a signal RST according to their magnitude relationship. When $V_{ERR}>V_{SLP}$, the signal RST is at high level, and when $V_{ERR}<V_{SLP}$, the signal RST is at low level. When $V_{ERR}=V_{SLP}$, the signal RST is at either high or low level.

The driver 156 is fed with the signals SET and RST and the control signal CNT2. During the high-level period of the control signal CNT2 (i.e., the lighting period specified by the control signal CNT2), based on the signals SET and RST the driver 156 controls the gate potential of the output transistor M1 and thereby performs the switching driving of the output transistor M1. When the gate potential of the output transistor M1 is at high level, the output transistor M1 is in the on state; when the gate potential of the output transistor M1 is at low level, the output transistor M1 is in the off state. Accordingly, in the switching driving of the output transistor M1, synchronously with an up edge (a transition from low level to high level) in the signal SET, the gate potential of the output transistor M1 is turned from low level to high level and thereby the output transistor M1 is turned on; thereafter, synchronously with a down edge (a transition from high level to low level) in the signal RST, the gate potential of the output transistor M1 is turned from high level to low level and thereby the output transistor M1 is turned off. The signal SET is a rectangular-wave signal of the frequency $f_{SW}$, and thus, during the high-level period of the control signal CNT2, the output transistor M1 is subjected to switching driving at the frequency $f_{SW}$.

Through the switching driving of the output transistor M1, the input voltage $V_{IN}$ is switched so that a voltage with a rectangular waveform appears at the node NDsw. The inductor L1 and the capacitor C1 constitute a rectifying-smoothing circuit that rectifies and smooths the voltage with a rectangular waveform appearing at the node NDsw to generate the output voltage $V_{OUT}$.

According to the reference voltage $V_{REF}$ fed to the error amplifier 153, the target current $I_{TG}$ is set, and feedback control is performed such that, during the high-level period of the control signal CNT2, the driving current $I_{LED}$ is equal to the target current $I_{TG}$.

For the inductor current $I_L$, a limit current $I_{OCL}$ is set as an upper-limit current. When, with the output transistor M1 in the on state, the voltage drop across the resistor R1 (i.e., the terminal-to-terminal voltage across the resistor R1) reaches a predetermined voltage that corresponds to the resistance value of the resistor R1 multiplied by the limit current $I_{OCL}$, the driver 156 turns off the output transistor M1 regardless of the level of the signal RST. The driver 156 is connected to the terminal GH as well as to the terminals BOOT and SW and, by operating a bootstrap circuit configured to include the capacitor C2, acquires a voltage with which to turn on the output transistor M1.

During the low-level period of the control signal CNT2 (i.e., the extinction period specified by the control signal CNT2), the driver 156 keeps the gate potential of the output transistor M1 at low level regardless of the signals SET and RST and thereby holds the output transistor M1 in the off state (i.e., suspends the switching driving of the output transistor M1). As a result, the switching of the input voltage $V_{IN}$ is suspended. During the low-level period of the control signal CNT2, once the output transistor M1 in the off state for certain, the operation of the switching controller 150 may be suspended.

In the lighting control device 10 in FIG. 1, the blocks identified by the reference signs "171" to "175" operate based on the input voltage $V_{IN}$ fed in via the terminal IN_TM, or based on an internal supply voltage generated from the input voltage $V_{IN}$. An internal power supply circuit 171 generates a predetermined internal supply voltage (e.g., a voltage of 5 V with reference to the ground GND2) at the terminal VREFA based on the input voltage $V_{IN}$. An undervoltage detection circuit 172 detects an undervoltage condition in which the input voltage $V_{IN}$ is too low. An overheat detection circuit 173 performs protective operation in accordance with the temperature of the lighting control device 10. An internal power supply circuit 174 generates a predetermined internal supply voltage (e.g., a voltage of 3 V with reference to the ground GND2) at the terminal VREFB based on the input voltage $V_{IN}$ or the voltage at the terminal VREFA. An enable detection circuit 175 enables or disables the lighting control device 10 according to the voltage at the terminal EN (with reference to the ground GND2). Only when the voltage at the terminal EN (with reference to the ground GND2) is equal to or higher than a predetermined enable voltage is the lighting control device 10 in an enabled state, and the switching driving described above is performed only in the enabled state. In the following description, unless otherwise stated, it is assumed that the lighting control device 10 is in the enabled state.

Figure 6:
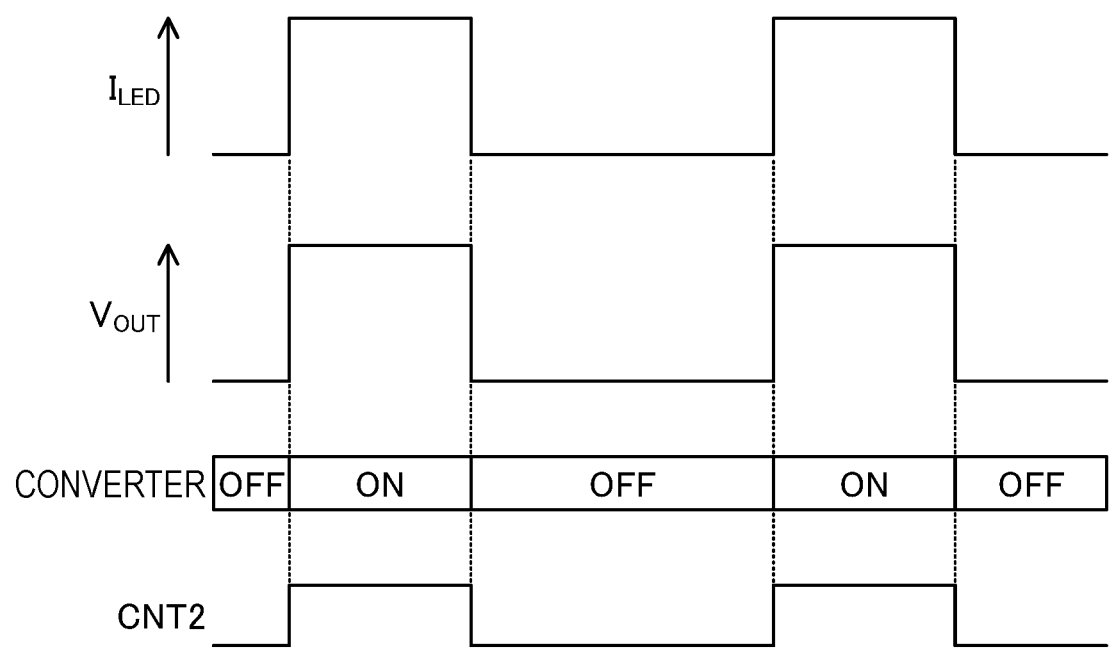
FIG. 6 is a schematic operating waveform diagram of a lighting device according to the first embodiment of the present disclosure.
Figure 7:
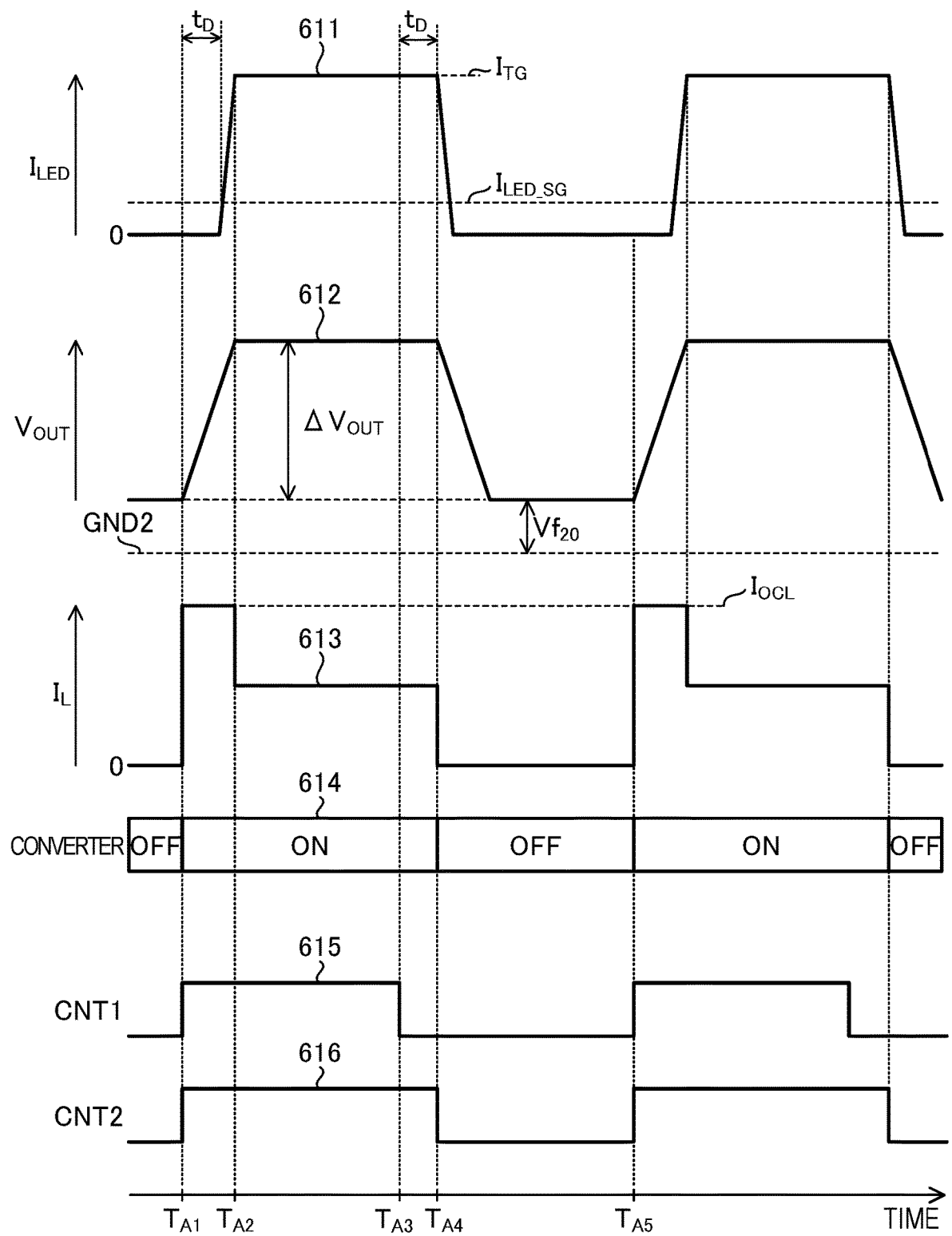
FIG. 7 is a detailed operating waveform diagram of the lighting device according to the first embodiment of the present disclosure.

FIG. 6 schematically shows the relationship among the driving current $I_{LED}$, the output voltage $V_{OUT}$, and the control signal CNT2 along with the operating state of the DC-DC converter configured to include the output transistor M1. While FIG. 6 shows as if, synchronously with an up edge in the control signal CNT2, the driving current $I_{LED}$ starts to flow with no delay, in reality the driving current $I_{LED}$ starts to flow with a delay. FIG. 7 shows waveforms observed in the lighting device 1, with the delay taken into consideration.

In FIG. 7, the waveforms 611, 612, 613, 615 and 616 indicated by polygonal solid lines depict the driving current $I_{LED}$, the output voltage $V_{OUT}$, the inductor current $I_L$, the control signal CNT1, and the control signal CNT2 respectively. In FIG. 7, identified by the reference sign "614" is the operating state of the DC-DC converter configured to include the output transistor M1.

Immediately before timing $T_{A1}$, the control signals CNT1 and CNT2 are at low level, the output transistor M1 is kept in the off state (i.e., the operation of the DC-DC converter is kept off), and the driving current $I_{LED}$ is substantially zero. At timing $T_{A1}$, the control signal CNT1 turns from low level to high level; thus, at timing $T_{A1}$, the control signal CNT2 too turns from low level to high level. In response to the control signal CNT2 turning to high level, the switching controller 150 starts to perform the switching driving of the output transistor M1 (i.e., the operation of the DC-DC converter is turned on). As a result, at timing $T_{A1}$, the output voltage $V_{OUT}$ starts to rise.

When the output voltage $V_{OUT}$ has risen to a certain point, the driving current $I_{LED}$ starts to increase; when at timing $T_{A2}$ the driving current $I_{LED}$ reaches the target current $I_{TG}$, feedback control acts in a direction to reduce the on duty of the output transistor M1. Through this feedback control, until the control signal CNT2 thereafter turns to low level (until timing $T_{A4}$ mentioned later), the driving current $I_{LED}$ is kept around the target current $I_{TG}$ and the output voltage $V_{OUT}$ is kept around a voltage suited to keep $I_{LED}=I_{TG}$. During the rise of the output voltage $V_{OUT}$ between timings $T_{A1}$ and $T_{A2}$, the inductor current $I_L$ remains approximately equal to the limit current $I_{OCL}$ (precisely, as a pulsating current of the frequency $f_{SW}$); when the feedback control that tends to reduce the on duty of the output transistor M1 acts, the inductor current $I_L$ becomes lower than the limit current $I_{OCL}$ under the feedback control.

After timing $T_{A2}$, at timing $T_{A3}$, the control signal CNT1 turns from high level to low level; at this timing, the control signal CNT2 is kept at high level. After timing $T_{A3}$, at timing $T_{A4}$, the control signal CNT2 turns from high level to low level. In response to the control signal CNT2 turning to low level, the switching controller 150 suspends the switching driving of the output transistor M1 (i.e., the operation of the DC-DC converter is turned off). Thus, at timing $T_{A4}$, the output voltage $V_{OUT}$ and the driving current $I_{LED}$ start to fall. After timing $T_{A4}$, owing to the electric charge stored in the capacitor C1, the driving current $I_{LED}$ flows for a length of time while decreasing until eventually becoming substantially equal to zero. After timing $T_{A4}$, the output voltage $V_{OUT}$ falls to a potential higher than the ground GND2 by a voltage $Vf_{20}$. The voltage $Vf_{20}$ is the forward voltage across the lighting unit 20 with a minute current (e.g., 1 µA) flowing through it. After timing $T_{A4}$, at timing $T_{A5}$, the control signals CNT1 and CNT2 turn back to high level. The operation during the unit period starting at timing $T_{A5}$ is the same as the operation during the unit period starting at timing TAL For the sake of discussion, if after timing $T_{A4}$ the control signal CNT2 is kept at low level for a sufficiently long time, the output voltage $V_{OUT}$ will eventually fall to the potential of the ground GND2. Here, however, it is assumed that the capacitor C1 has a sufficient capacitance to keep the output voltage $V_{OUT}$ from falling below the voltage $Vf_{20}$.

Let the difference between the output voltage $V_{OUT}$ between timings $T_{A2}$ and $T_{A4}$ and the voltage $Vf_{20}$ be $\Delta V_{OUT}$. Then, the time lag between timings $T_{A1}$ and $T_{A2}$ is given by $(C1 \times \Delta V_{OUT})/(I_{OCL} \times DUTY_{OFF})$. Here, $DUTY_{OFF}$ represents the off duty of the output transistor M1 between timings $T_{A1}$ and $T_{A2}$ (the proportion of the off period of the output transistor M1 in the sum of the on and off periods of the output transistor M1).

At a particular timing after timing $T_{A1}$ but before timing $T_{A2}$, the driving current $I_{LED}$ in the process of rising reaches a predetermined judgment current $I_{LED\_SG}$. The time from timing $T_{A1}$ to that particular timing is referred to as the delay time $t_D$. The control signal corrector 120 generates the control signal CNT2 such that timing $T_{A4}$, at which the control signal CNT2 turns from high level to low level, is delayed by the delay time $t_D$ from timing $T_{A3}$, at which the control signal CNT1 turns from high level to low level. That is, the control signal CNT2 is generated by correcting, in each of the cycles recurring at the frequency $f_{PWM}$, the control signal CNT1 in a direction in which the lighting period is extended by the time $(t_D)$ after the start of the lighting period (after an up edge in the control signals CNT1 and CNT2) until the driving current $I_{LED}$ reaches the predetermined judgment current $I_{LED\_SG}$.

In this way, the light emission time of the lighting unit 20 becomes substantially equal to the time specified by the control signal CNT1 (the length of the high-level period of the control signal CNT1), and this makes it possible to achieve dimming as set by the dimming signal DIM.

Figure 8:
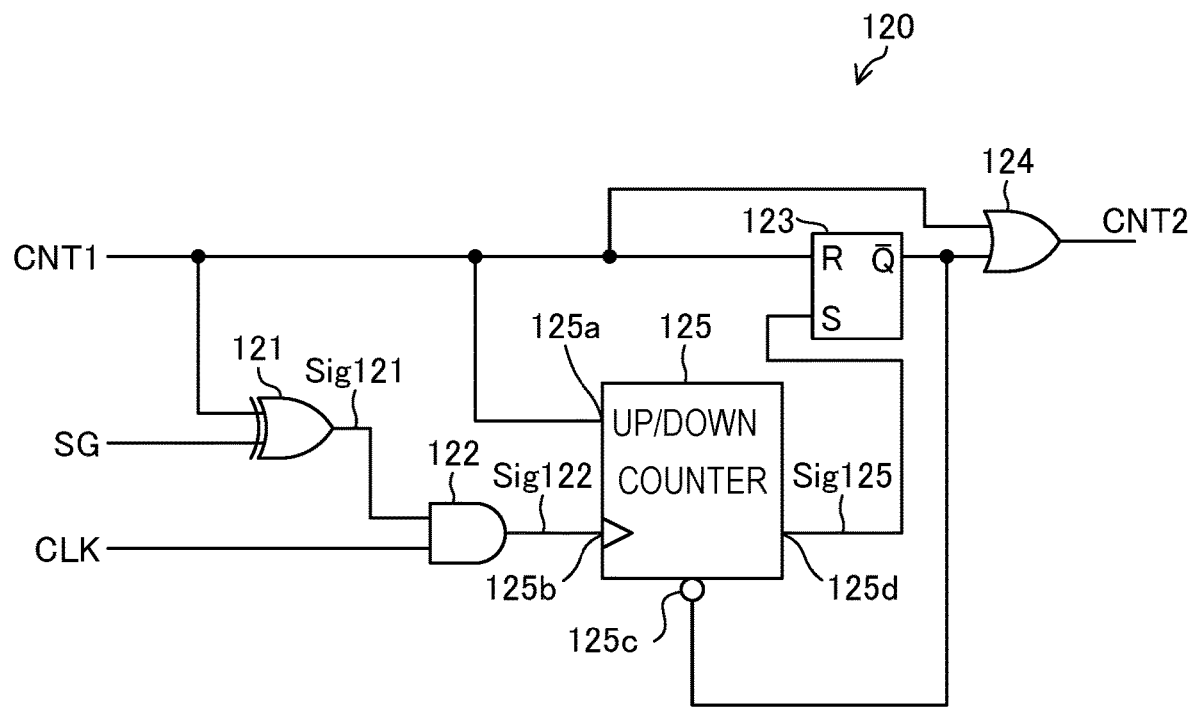
FIG. 8 is a configuration diagram of a control signal corrector according to the first embodiment of the present disclosure.

FIG. 8 shows a configuration example of the control signal corrector 120. The control signal corrector 120 in FIG. 8 includes an EXOR circuit 121, which is a two-input exclusive logical disjunction circuit; an AND circuit 122, which is a two-input logical conjunction circuit; a FF 123, which is an asynchronous set/reset-type flip-flop circuit; an OR circuit 124, which is a two-input logical disjunction circuit; and a counter 125, which is an up/down counter.

The EXOR circuit 121 has a first input terminal, a second input terminal, and an output terminal, and outputs via the output terminal a signal Sig121. The first and second input terminals of the EXOR circuit 121 are fed with the control signal CNT1 and the current state signal SG respectively. The EXOR circuit 121 outputs a low-level signal Sig121 if the control signal CNT1 and the current state signal SG are both at high level or if the control signal CNT1 and the current state signal SG are both at low level. The EXOR circuit 121 outputs a high-level signal Sig121 if, of the control signal CNT1 and the current state signal SG, one is at high level and the other is at low level.

The AND circuit 122 has a first input terminal, a second input terminal, and an output terminal, and outputs via the output terminal a signal Sig122. The first and second input terminals of the AND circuit 122 are fed with the signal Sig121 and a clock signal CLK respectively. The clock signal CLK is a rectangular-wave signal of which the signal level changes between low and high levels cyclically, and is generated by a clock signal generator (not shown) incorporated in the lighting control device 10. The clock signal CLK has a frequency $f_{CLK}$ significantly higher than the frequency $f_{PWM}$ of the control signals CNT1 and CNT2. For example, whereas the frequency $f_{PWM}$ is about several hundred hertz, the frequency $f_{CLK}$ is several tens of kilohertz to several hundred kilohertz. The signal SET generated in the oscillator 154 may be used as the clock signal CLK. The AND circuit 122 outputs a high-level signal Sig122 only if the signal Sig121 and the clock signal CLK are both at high level, and otherwise keeps the signal Sig121 at low level.

The FF 123 has a set terminal, a reset terminal, and an inverting output terminal, and outputs via the inverting output terminal a signal Sig123. The set terminal and reset terminal of the FF 123 are fed with a signal Sig125 and the control signal CNT1 respectively. The FF 123 holds the logical value "1" if the signal Sig125 is at high level and in addition the control signal CNT1 is at low level, and holds the logical value "0" if the signal Sig125 is at low level and in addition the control signal CNT1 is at high level. The FF 123 does not change the logical value it holds if the signal Sig125 is at low level and in addition the control signal CNT 1 is at low level. When holding the logical value "1", the FF 123 outputs a low-level signal Sig123 and, when holding the logical value "0", the FF 123 outputs a high-level signal Sig123. In the configuration in FIG. 8, it does not occur that the signal Sig125 and the control signal CNT1 are simultaneously at high level.

The OR circuit 124 has a first input terminal, a second input terminal, and an output terminal, and outputs via the output terminal the control signal CNT2. The first and second input terminals of the OR circuit 124 are fed with the control signal CNT1 and the signal Sig123 respectively. The OR circuit 124 keeps the control signal CNT2 at high level if at least one of the control signal CNT1 and the signal Sig123 is at high level, and keeps the control signal CNT2 at low level only if the control signal CNT1 and the signal Sig123 are both at low level.

The counter 125 has input terminals 125a, 125b, and 125c and an output terminal 125d. The input terminals 125a, 125b, and 125c are fed with the control signal CNT1, the signal Sig122, and the signal Sig123 respectively, and from the output terminal 125d, the signal Sig125 is output.

The counter 125 has the function of counting upward or downward a count value $VAL_{CNT}$ it manages. The count value $VAL_{CNT}$ has an initial value of zero.

In the high-level period of the signal Sig123, the counter 125 performs upward counting if the control signal CNT1 is at high level and performs downward counting if the control signal CNT1 is at low level. The counter 125, in upward counting, increments the count value $VAL_{CNT}$ by one every time an up edge occurs in the signal Sig122 and, in downward counting, decrements the count value $VAL_{CNT}$ by one every time an up edge occurs in the signal Sig122. The counter 125 may instead, in upward counting, increment the count value $VAL_{CNT}$ by one every time a down edge occurs in the signal Sig122 and, in downward counting, decrement the count value $VAL_{CNT}$ by one every time a down edge occurs in the signal Sig122. The lower limit of the count value $VAL_{CNT}$ is zero, and it does not occur that the count value $VAL_{CNT}$ falls below zero.

During the low-level period of the signal Sig123, the counter 125 performs neither upward nor downward counting, and keeps the count value $VAL_{CNT}$ unchanged.

Moreover, the counter 125, if the count value $VAL_{CNT}$ is zero, keeps the signal Sig125 at high level and, if the count value $VAL_{CNT}$ is not zero (hence when $VAL_{CNT}>0$), keeps the signal Sig125 at low level.

Figure 9:
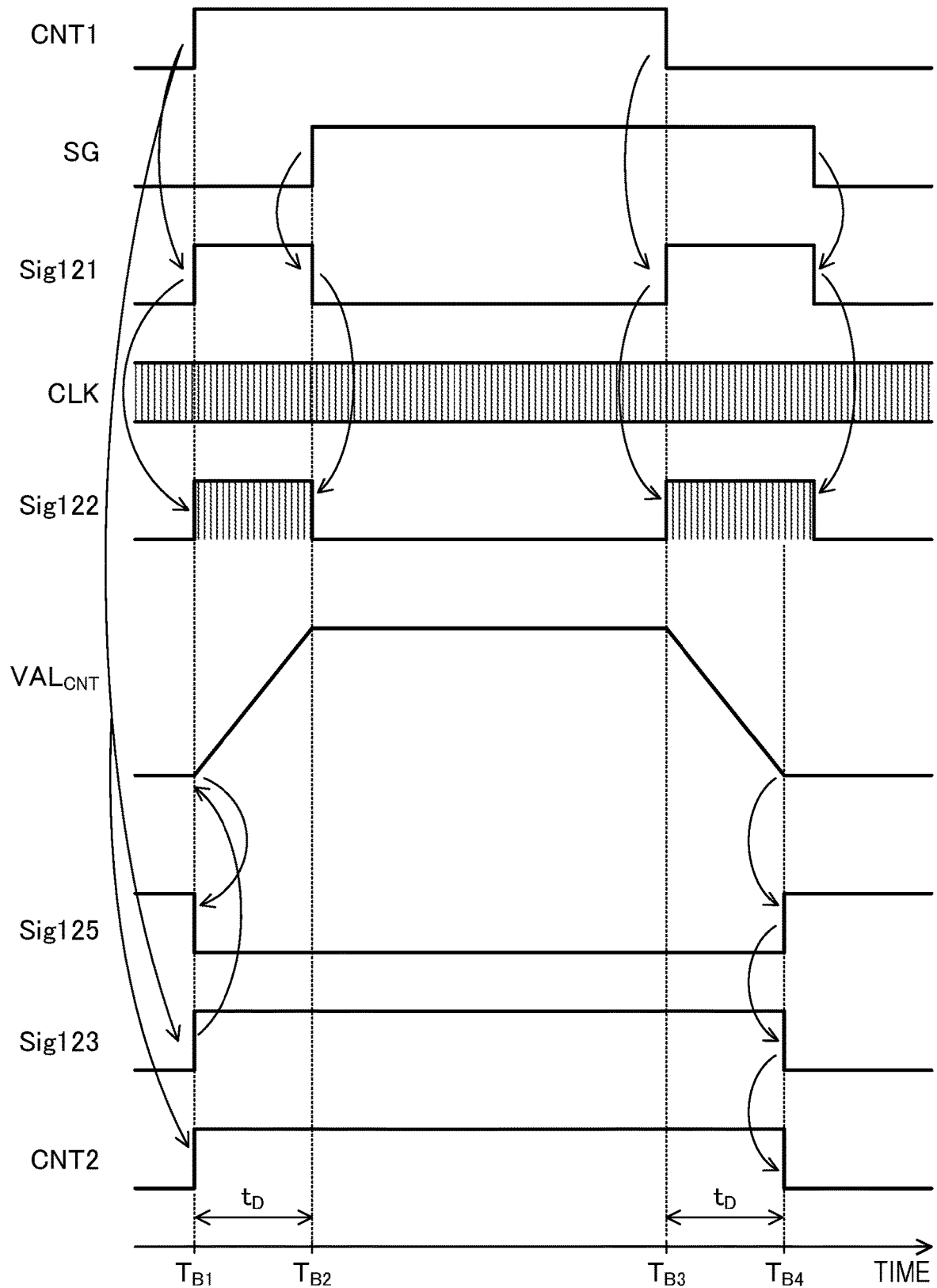
FIG. 9 is a timing chart illustrating the operation of the control signal corrector in FIG. 8.

FIG. 9 is a timing chart of the control signal corrector 120. In FIG. 9, the period between timings $T_{B1}$ and $T_{B2}$ corresponds to the high-level period (lighting period) of the control signal CNT2 within one unit period. Timings $T_{B1}$, $T_{B2}$, and $T_{B4}$ in FIG. 9 correspond to $T_{A1}$, $T_{A2}$, and $T_{A4}$ in FIG. 7. Timing $T_{B2}$ in FIG. 9 corresponds to the timing that the delay time $t_D$ mentioned above has elapsed after the timing $T_{B1}$. It is assumed that, immediately before timing $T_{B1}$, the count value $VAL_{CNT}$ equals zero.

At timing $T_{B1}$, an up edge occurs in the control signal CNT1. Immediately before timing $T_{B1}$, the driving current km equals substantially zero, and thus, immediately before and at timing $T_{B1}$, the current state signal SG is at low level. Accordingly, the EXOR circuit 121 so operates that, synchronously with the up edge in the control signal CNT1 at timing $T_{B1}$, an up edge occurs in the signal Sig121. After the signal Sig121 turns to high level at timing $T_{B1}$, until the signal Sig121 turns to low level, a signal identical with the clock signal CLK appears as the signal Sig122. On the other hand, the FF 123 and the OR circuit 124 so operate that, synchronously with an up edge in the control signal CNT1 at timing $T_{B1}$, an up edge occurs also in the signal Sig123 and in the control signal CNT2. At timing $T_{B1}$, the signal Sig123 turns to high level, and this enables the above-mentioned upward or downward counting. From timing $T_{B1}$ to timing $T_{B2}$, the control signal CNT1 is at high level, and thus upward counting is performed; after upward counting is started, when $VAL_{CNT}>0$, a down edge occurs in the signal Sig125.

In response to the control signal CNT2 turning to high level at timing $T_{B1}$, the switching controller 150 starts the switching driving of the output transistor M1 (i.e., the operation of the DC-DC converter is turned on). Thus, at timing $T_{B1}$, the output voltage $V_{OUT}$ starts to rise. When the output voltage $V_{OUT}$ has risen to a certain point, the driving current $I_{LED}$ starts to increase; at timing $T_{B2}$, the driving current $I_{LED}$ reaches the judgment current $I_{LED\_so}$, and thus an up edge occurs in the current state signal SG. The control signal CNT1 is at high level from timing $T_{B1}$ to timing $T_{B3}$ after timing $T_{B2}$, and thus, synchronously with the up edge in the current state signal SG at timing $T_{B2}$, a down edge occurs in the signal Sig121. This causes a transition to a state where the signal Sig122 is held at low level; thus, the incrementing of the count value $VAL_{CNT}$ by upward counting is suspended until timing $T_{B2}$.

Thereafter, at timing $T_{B3}$, a down edge occurs in the control signal CNT1. After timing $T_{B2}$, the driving current $I_{LED}$ is continuously kept higher than the judgment current $I_{LED\_SG}$, and thus at timing $T_{B3}$ the current state signal SG is at high level. Accordingly, synchronously with the down edge in the control signal CNT1 at timing $T_{B3}$, an up edge occurs in the signal Sig121. This restarts the state where a signal equivalent to the clock signal CLK appears as the signal Sig122, but here, since after timing $T_{B3}$ the control signal CNT1 is at low level, from the timing $T_{B3}$ downward counting is performed synchronously with the signal Sig122.

By the downward counting that starts at timing $T_{B3}$, the count value $VAL_{CNT}$ is decremented starting with the count value $VAL_{CNT}$ at timing $T_{B3}$ until, at timing $T_{B4}$, the count value $VAL_{CNT}$ falls down to zero. Then, at timing $T_{B4}$, an up edge occurs in the signal Sig125. In synchronization with the up edge in the signal Sig125, a down edge occurs in the signal Sig123, and, since at this timing the control signal CNT1 is at low level, at timing $T_{B4}$ a down edge occurs in the control signal CNT2. In response to the down edge in the control signal CNT2 at timing $T_{B4}$, the switching driving of the output transistor M1 is suspended (i.e., the operation of the DC-DC converter is turned off). Now the output voltage $V_{OUT}$ and the driving current $I_{LED}$ decreases until, when the driving current $I_{LED}$ falls below the judgment current $I_{LED\_SG}$, a down edge occurs in the current state signal SG and a down edge occurs also in the signal Sig121, causing a return to the state where the signal Sig122 is kept at low level.

Since the frequency $f_{CLK}$ of the clock signal CLK is fixed, the time between timings $T_{B3}$ and $T_{B4}$ is equal to the time between timings $T_{B1}$ and $T_{B2}$ (i.e., the delay time $t_D$).

As described above, within each of the cycles recurring at the frequency $f_{PWM}$, the start of the switching of the input voltage $V_{IN}$ causes the output voltage $V_{OUT}$ to rise; as the output voltage $V_{OUT}$ rises, when the driving current $I_{LED}$ flowing through the lighting unit 20 reaches the predetermined judgment current $I_{LED\_SG}$, the comparator 140 (current state signal generator) turns the current state signal SG from a first state (here, low level) to a second state (here, high level). Within each of the cycles recurring at the frequency $f_{PWM}$, after the start of the lighting period (from timing T0 until the current state signal SG is turned from the first state to the second state, the control signal corrector 120 corrects the control signal CNT1 (raw control signal) in a direction in which the lighting period is extended by the time ($t_D$) and thereby generates the control signal CNT2 (corrected control signal).

While here the first and second states of the current state signal SG corresponding to low and high levels respectively, the correspondence may be reversed.

More specifically, within each of the cycles recurring at the frequency $f_{PWM}$, the control signal corrector 120 performs a first measurement process to measure a first time (the time between timings $T_{B1}$ and $T_{B2}$) after the start of the lighting period (from timing T0 until a current state signal turns from the first state to the second state; the control signal corrector 120 then performs a second measurement process to measure the time lapse after the timing (timing $T_{B3}$) of the transition from the lighting period to the extinction period in the control signal CNT1; and, after the first measurement process, when the time lapse measured in the second measurement process reaches the first time (i.e., at timing $T_{B4}$), the control signal corrector 120 changes the period specified by the control signal CNT2 from the lighting period to the extinction period (here, turns the control signal CNT2 from high level to low level).

The first measurement process described above is achieved by the upward counting between timings $T_{B1}$ and $T_{B2}$, and the second measurement process described above is achieved by the downward counting between timings $T_{B3}$ and $T_{B4}$.

In the configuration in FIG. 8, the counter 125 as an upward counter operates as follows. Within each of the cycles recurring at the frequency $f_{PWM}$, after the start of the lighting period (from timing T0 until the current state signal SG turns from the first state (here, low level) to the second state (here, high level), synchronously with a predetermined clock signal CLK, the counter 125 changes the count value $VAL_{CNT}$, starting at a predetermined initial value (here, zero), in a first direction (here, in the incrementing direction). Thereafter, from the timing (timing $T_{B3}$) of the transition from the lighting period to the extinction period in the control signal CNT1 until the count value $VAL_{CNT}$ returns to the initial value, synchronously with the clock signal CLK, the counter 125 changes the count value $VAL_{CNT}$ in a second direction (here, in the decrementing direction) opposite to the first direction. Changing the count value $VAL_{CNT}$ in the first direction achieves the first measurement process, and changing the count value $VAL_{CNT}$ in the second direction achieves the second measurement process. When the count value $VAL_{CNT}$ returns to the initial value in the second measurement process, the control signal corrector 120 changes the period specified by the control signal CNT2 from the lighting period to the extinction period (here, the control signal CNT2 is turned from high level to low level).

In a case where the first measurement process is achieved by upward counting, the first direction corresponds to the incrementing direction, and in a case where the second measurement process is achieved by downward counting, the second direction corresponds to the decrementing direction. Instead, the first measurement process may be achieved by downward counting and the second measurement process by upward counting, in which case the first direction corresponds to the decrementing direction and the second direction to the incrementing direction.

While in this embodiment the low-level period of the control signals CNT1 and CNT2 is associated with the extinction period and the high-level period of the control signals CNT1 and CNT2 is associated with the lighting period, a modification the other way around is possible where the high-level period of the control signals CNT1 and CNT2 is associated with the extinction period and the low-level period of the control signals CNT1 and CNT2 is associated with the lighting period.

Second Embodiment

A second embodiment of the present disclosure will be described. The second embodiment deals with applied technologies applicable to the first embodiment, modified technologies derived from the first embodiment, and the like.

In the configuration example in FIG. 1, the DC-DC converter that generates the output voltage $V_{OUT}$ from the input voltage $V_{IN}$ employs diode rectification; instead, the DC-DC converter may employ synchronous rectification. In a configuration that employs synchronous rectification, the lighting device 1 can include, as a rectification element, a synchronous rectification transistor (not shown) instead of the diode D1. In that case, the synchronous rectification transistor can be configured as an N-channel MOSFET, with its drain and the source connected to the node NDsw and the ground GND2 respectively, and the driver 156 can control the gate potential of the synchronous rectification transistor to turn it on and off. Specifically, during the high-level period of the control signal CNT2, the driver 156 can keep the synchronous rectification transistor off when the output transistor M1 is on and keep the synchronous rectification transistor on when the output transistor M1 is off.

In configuration example in FIG. 1, some of the components provided outside the lighting control device 10 may be incorporated in the lighting control device 10. For example, the resistor R1, the output transistor M1, and the diode D1 in FIG. 1 may be incorporated in the lighting control device 10. In that case, the terminals CSH, CSL, and GH are internal terminals of the lighting control device 10. In a configuration that employs synchronous rectification, the resistor R1, the output transistor M1, and the synchronous rectification transistor may be incorporated in the lighting control device 10.

Figure 10:
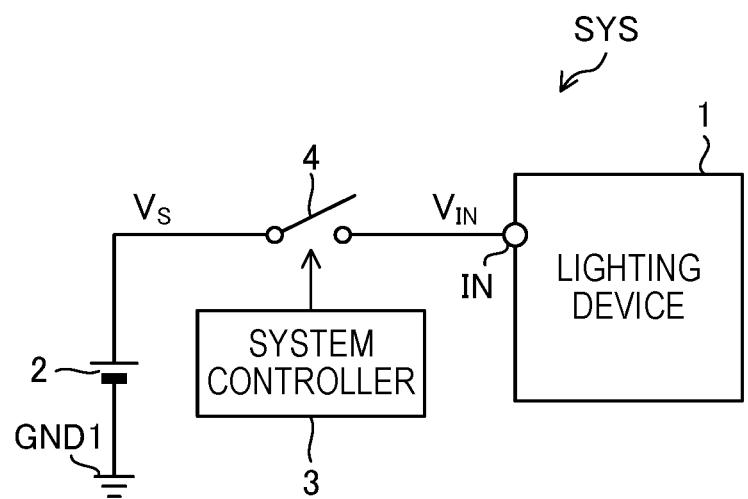
FIG. 10 is a configuration diagram of a lighting system according to a second embodiment of the present disclosure.

FIG. 10 shows the configuration of a lighting system SYS that incorporates the lighting device 1. The lighting system SYS includes the lighting device 1, a voltage source 2, a system controller 3, and a switch 4. The voltage source 2 has a negative terminal and a positive terminal. The negative terminal of the voltage source 2 is connected to the ground GND1, and the voltage source 2 outputs via the positive terminal a positive direct-current voltage Vs with reference to the potential of the ground GND1. Between the positive terminal of the voltage source 2 and the input terminal IN of the lighting device 1, the switch 4 is inserted in series; thus, only when the switch 4 is on is the output voltage Vs of the voltage source 2 supplied as the input voltage $V_{IN}$ to the input terminal IN. When the switch 4 is off, the potential at the input terminal IN is equal to the potential of the ground GND1 (a transient state ignored). The system controller 3 controls the switch 4 to turn it on and off. In the lighting system SYS, only when the switch 4 is on does the lighting unit 20 PWM-driven light.

Figure 11:
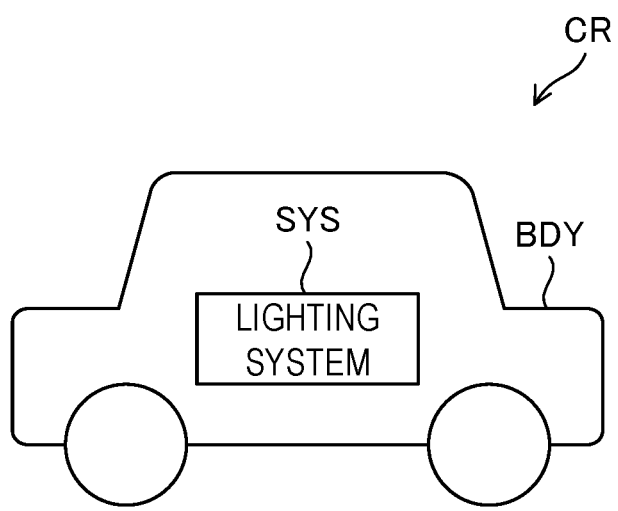
FIG. 11 is a diagram showing a lighting system incorporated in a vehicle according to the second embodiment of the present disclosure.
Figure 12:
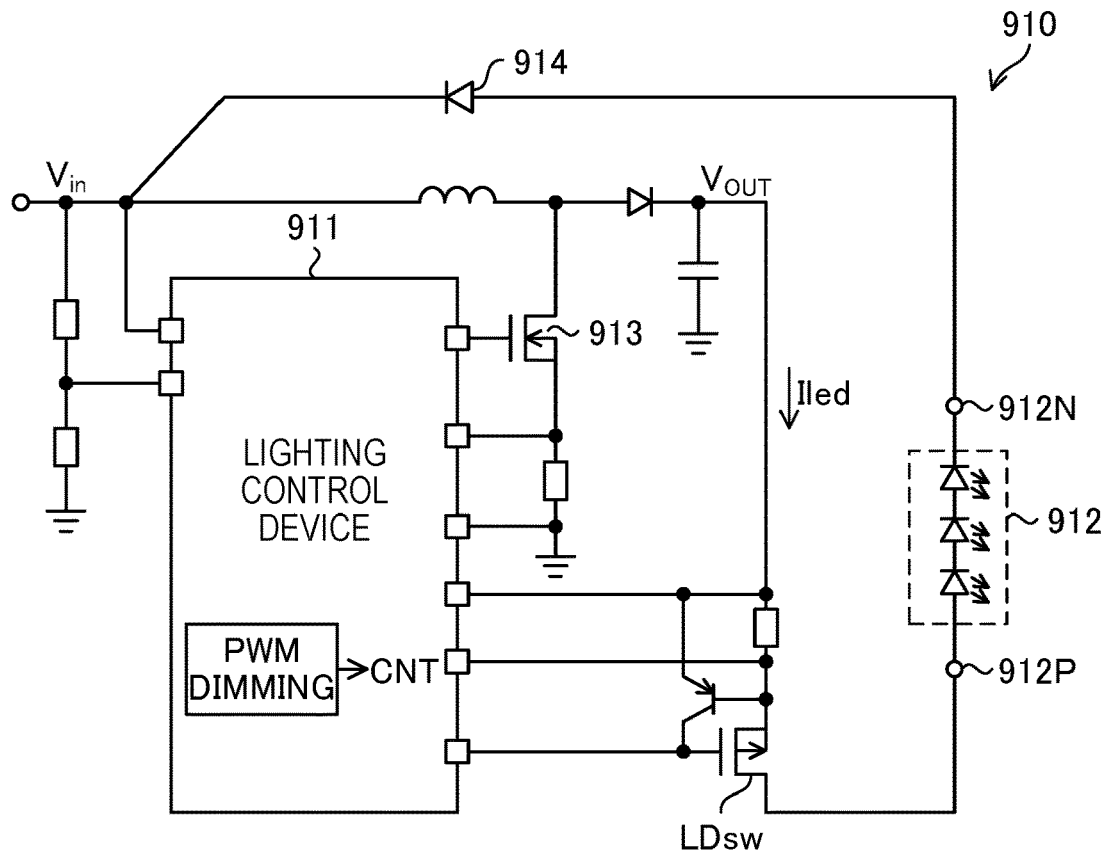
FIG. 12 is a configuration diagram of a lighting device of a first reference configuration.
Figure 13:
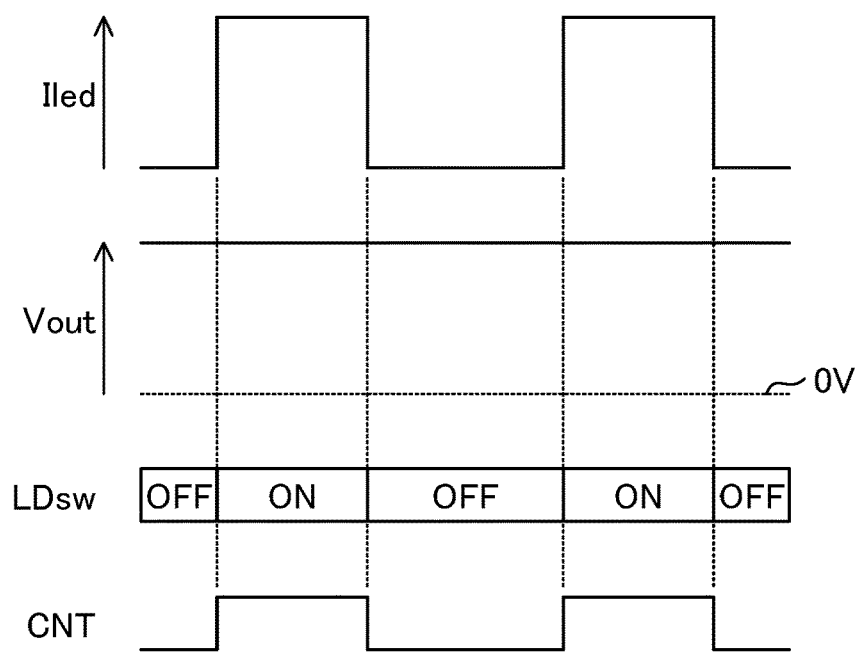
FIG. 13 is a diagram illustrating the operation of the lighting device of the first reference configuration.
Figure 14:
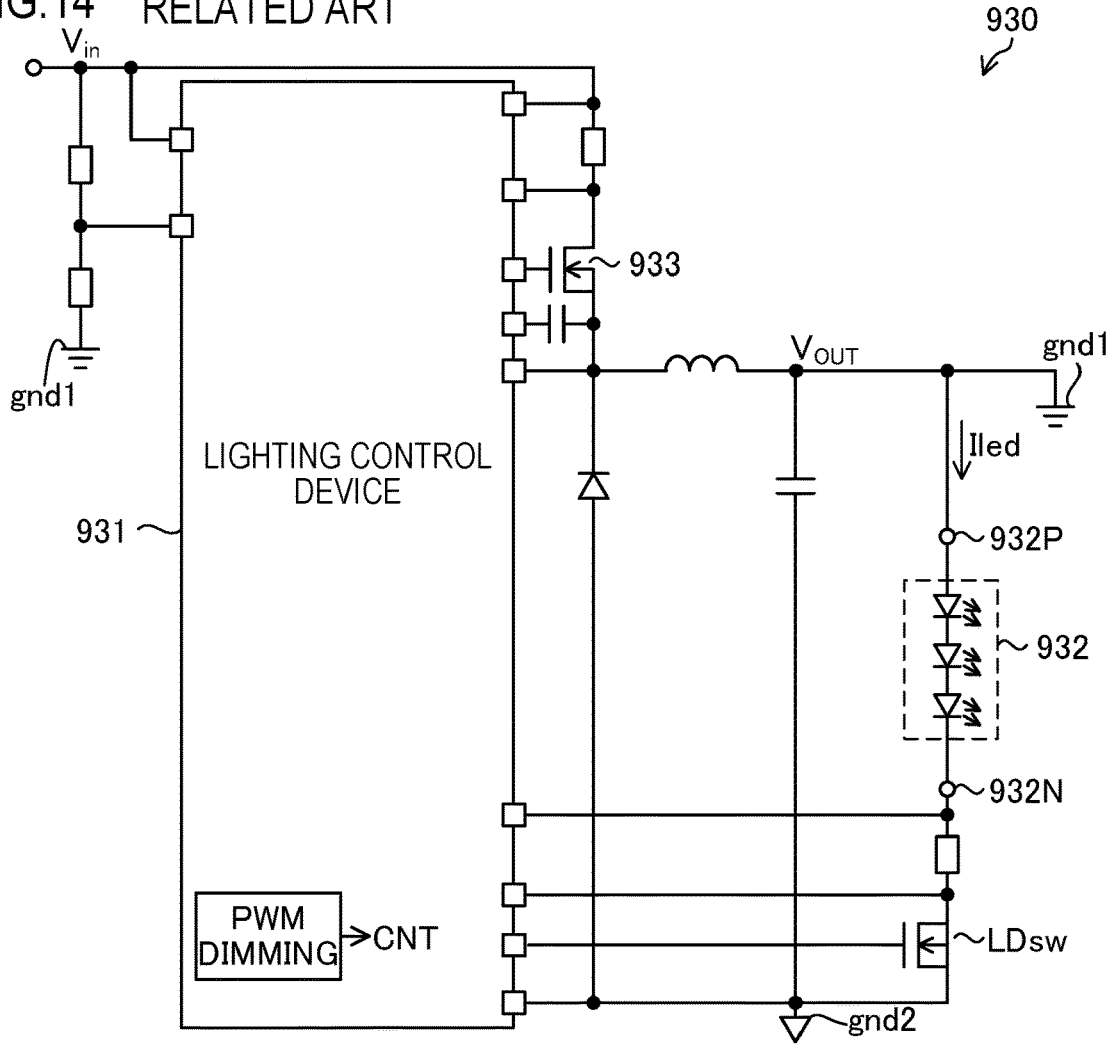
FIG. 14 is a configuration diagram of a lighting device of a second reference configuration.
Figure 15:
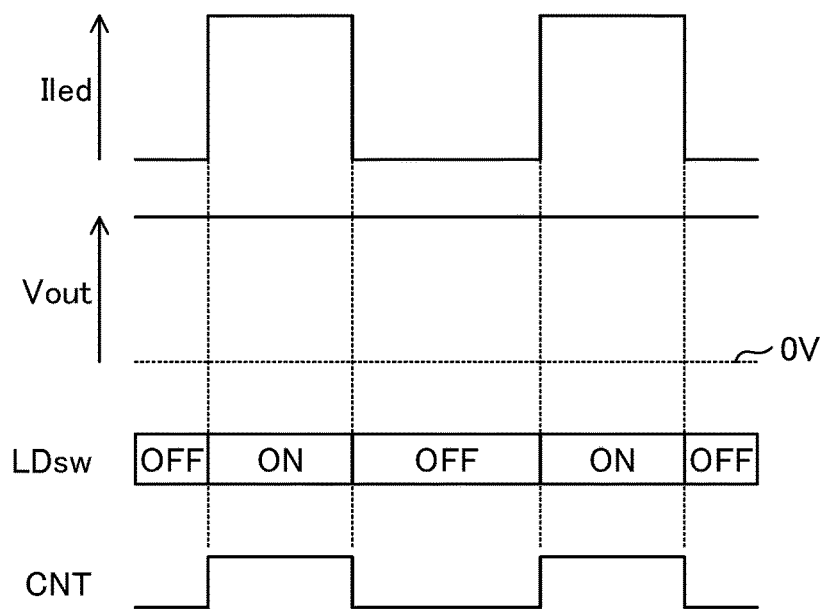
FIG. 15 is a diagram illustrating the operation of the lighting device of the second reference configuration.
Figure 16:
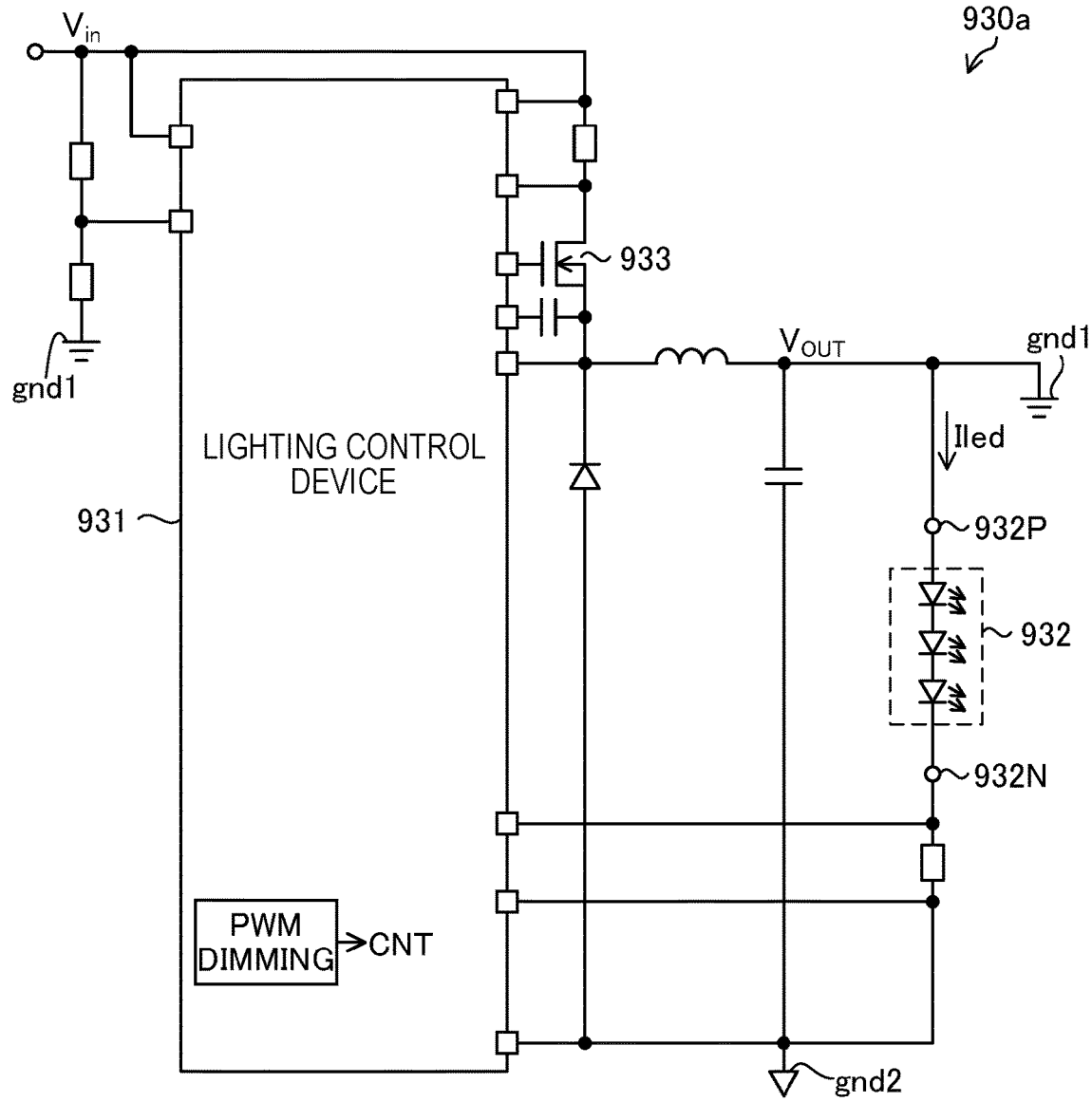
FIG. 16 is a configuration diagram of a lighting device of a third reference configuration.
Figure 17:
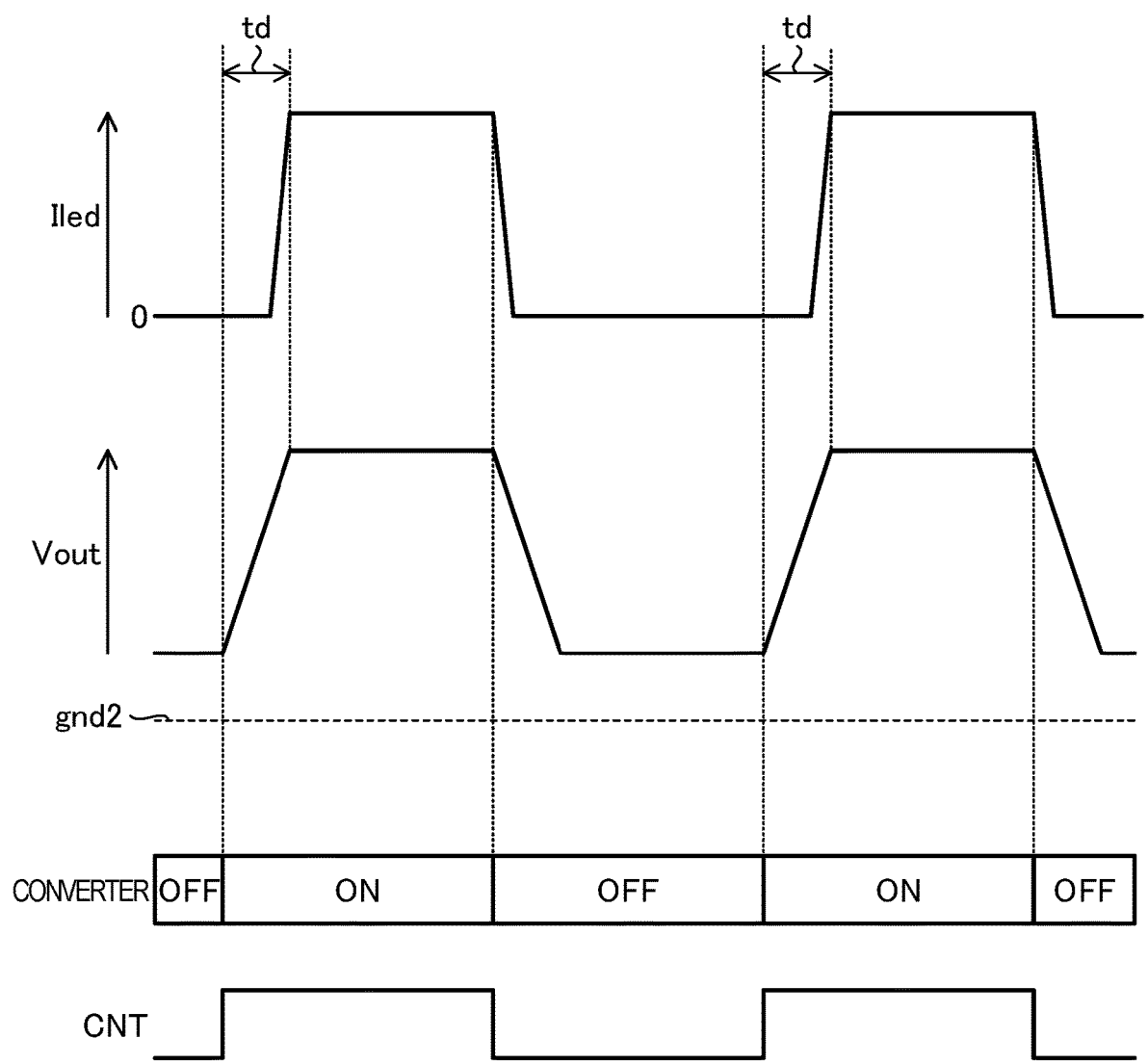
FIG. 17 is a diagram illustrating the operation of the lighting device of the third reference configuration.

As shown in FIG. 11, the lighting system SYS can be mounted on a vehicle CR. The vehicle CR is, for example, any car that can run on a road. While FIG. 11 assumes a four-wheel automobile as the vehicle CR, the vehicle CR may be any vehicle such as a motorbike. The vehicle CR includes a body BDY formed of metal or the like and the lighting system SYS installed in the body BDY. The voltage source 2 in the lighting system SYS may be a battery provided in the vehicle CR, or may be a power supply circuit that generates the direct-current voltage Vs by performing DC-DC conversion on the output voltage of the battery. The lighting device 1 can be used as any lighting apparatus on the vehicle CR (i.e., a vehicle-mounted lighting apparatus), and the lighting apparatus implemented with the lighting device 1 is provided at a predetermined place in the body BDY. For example, the lighting device 1 can be used as a headlamp (headlight) of the vehicle CR. The lighting device 1 can be used as any lighting apparatus other than a headlamp (such as a tail lamp, brake lamp, fog lamp, direction indicator lamp, or the like) on the vehicle CR.

The present disclosure may be applied to any uses other than vehicle onboard uses. That is, the lighting device 1 or the lighting system SYS may be incorporated in any equipment other than vehicles.

The average luminance of the PWM-driven lighting unit 20 is set based on the dimming signal DIM. While in the configuration example in FIG. 1 the dimming signal DIM is a fixed analog voltage, the dimming signal DIM may instead be a variable analog voltage that is fed from a circuit (e.g., the system controller 3 in FIG. 10) provided outside the lighting control device 10. Or, in a configuration where communication via a serial peripheral interface or the like is possible between the lighting control device 10 and a circuit (e.g., the system controller 3 in FIG. 10) provided outside the lighting control device 10, the dimming signal DIM may be set according to a digital signal communicated from the circuit provided outside.

The light-emitting elements constituting the lighting unit 20 may be any light-emitting elements other than light-emitting diodes, and may be, for example, light-emitting elements employing organic electroluminescence.

For any signal or voltage, the relationship between its high and low levels may be reversed so long as that can be done without departure from what has been described above.

Any of the transistors mentioned above may be of any type. For example, any of the transistors mentioned above as a MOSFET may be replaced with a junction FET, an IGBT (insulated-gate bipolar transistor), or a bipolar transistor.

Embodiments of the present disclosure can be modified in many ways as necessary without departure from the scope of the technical concepts defined in the appended claims. The embodiments described herein are merely examples of how the present disclosure can be implemented, and what is meant by any of the terms used to describe the present disclosure and its constituent elements is not limited to what is specifically mentioned above in connection with the embodiments. The specific values mentioned in the above description are merely illustrative and needless to say can be modified to different values.

The invention claimed is:

1. A lighting control device that generates an output voltage by switching of an input voltage and that supplies a driving current based on the output voltage to a lighting unit to light the lighting unit, comprising:
   a control signal generator configured to generate as a raw control signal a control signal that specifies alternately a lighting period in which to keep the lighting unit lit and a extinction period in which to keep the lighting unit extinguished;
   a lighting unit current sensor configured to sense a current flowing through the lighting unit;
   a control signal corrector configured to generate a corrected control signal by correcting, based on a current state signal based on a result of sensing by the lighting unit current sensor, the raw control signal in a direction in which the lighting period is extended; and
   a switching controller configured to:
      perform the switching of the input voltage during the lighting period specified by the corrected control signal and
      suspend the switching of the input voltage during the extinction period specified by the corrected control signal,
   wherein the control signal corrector is configured to generate the corrected control signal by, while keeping a start timing of the lighting period same before and after correction, correcting the raw control signal in the direction in which the lighting period is extended by a time required, after a start of the lighting period, for the current flowing through the lighting unit to reach a predetermined judgement current.

2. The lighting control device according to claim 1, wherein
   in each of the raw control signal and the corrected control signal, the lighting period and the extinction period are specified alternately at a predetermined cycle, and
   in each cycle, the lighting period in the corrected control signal is extended compared with the lighting period in the raw control signal by correction by the control signal corrector.

3. The lighting control device according to claim 1, further comprising a current state signal generator configured to generate the current state signal, wherein
   the current state signal generator is configured such that, after a start of the switching of the input voltage, when the output voltage has risen until the current flowing through the lighting unit reaches the judgement current, the current state signal generator switches the current state signal from a first state to a second state, and the control signal corrector is configured to correct the raw control signal in the direction in which the lighting period is extended by the time after a start of the lighting period until the current state signal turns from the first state to the second state.

4. The lighting control device according to claim 3, wherein the control signal corrector is configured to perform a first measurement process to measure a first time after the start of the lighting period until the current state signal turns from the first state to the second state, perform a second measurement process to measure a time lapse after a timing of a transition from the lighting period to the extinction period in the raw control signal, and switch a period specified by the current state signal from the lighting period to the extinction period when, after the first measurement process, the time lapse in the second measurement process reaches the first time.

5. The lighting control device according to claim 4, wherein the control signal corrector includes an up/down counter and is configured to perform the first and second measurement processes using the up/down counter.

6. The lighting control device according to claim 5, wherein the up/down counter is configured such that after the start of the lighting period until the current state signal turns from the first state to the second state, synchronously with a predetermined clock signal, the up/down counter changes a count value, starting at a predetermined initial value, in a first direction and then, after the timing of the transition from the lighting period to the extinction period in the raw control signal until the count value returns to the initial value, the up/down counter changes, synchronously with the clock signal, the count value in a second direction opposite to the first direction, the first measurement process is achieved by the count value being changed in the first direction and the second measurement process is achieved by the count value being changed in the second direction, and the control signal corrector is configured to switch the period specified by the corrected control signal from the lighting period to the extinction period when the count value has returned to the initial value in the second measurement process.

7. The lighting control device according to claim 1, wherein the lighting unit includes one or more light-emitting elements that emit light by being supplied with a current.

8. A lighting device, comprising:

the lighting control device according to claim 1; and a lighting unit configured to be supplied with a driving current under control of the lighting control device.

9. A vehicle, comprising:

the lighting device according to claim 8 as a vehicle-mounted lighting apparatus;

a voltage source configured to supply the lighting device with an input voltage; and a body in which the lighting apparatus is installed.

* * * * *